United States Patent
Forster et al.

(10) Patent No.: US 6,281,797 B1
(45) Date of Patent: Aug. 28, 2001

(54) METHOD AND APPARATUS FOR DETECTING A CONTAINER PROXIMATE TO A TRANSPORTATION VESSEL HOLD

(75) Inventors: Ian J. Forster, Essex (GB); Mark McGlade, Berkeley Lake, GA (US); Peter Robert George Horrell, Essex (GB); David J. Puleston, Doraville, GA (US)

(73) Assignee: Marconi Data Systems Inc., Wood Dale, IL (US)

( * ) Notice: Subject to any disclaimer, the term of this patent is extended or adjusted under 35 U.S.C. 154(b) by 0 days.

(21) Appl. No.: 09/542,772

(22) Filed: Apr. 4, 2000

(51) Int. Cl.$^7$ .................................................. G08B 13/14
(52) U.S. Cl. ............................... 340/572.3; 340/572.1; 340/988; 340/438; 340/825.49
(58) Field of Search ................... 340/572.3, 572.1, 340/988, 438, 825.49, 10.5, 10.51, 10.36, 40.49

(56) References Cited

U.S. PATENT DOCUMENTS

| | | | |
|---|---|---|---|
| 3,418,574 | 12/1968 | Wyckoff | 324/77 |
| 4,688,244 | 8/1987 | Hannon et al. | 379/58 |
| 5,003,824 | 4/1991 | Fukada et al. | 367/124 |
| 5,033,034 | 7/1991 | Paradise | 367/124 |
| 5,165,064 | 11/1992 | Mattaboni | 356/152 |
| 5,565,858 | 10/1996 | Guthrie | 340/825.35 |
| 5,648,763 | 7/1997 | Long | 340/825.49 |
| 5,825,283 | 10/1998 | Camhi | 340/438 |
| 5,835,322 | 11/1998 | Smith et al. | 361/45 |
| 5,894,323 | 4/1999 | Kain et al. | 348/116 |
| 6,023,244 | * 2/2000 | Snygg et al. | 343/700 |

OTHER PUBLICATIONS

"Snowflake TM Code", Mar. 27, 2000, http:/marconidata.com/products/prod_snowflake_code.html.

"TLC Net–Tracker on Containers, Refrigerated and Shipping Containers", Jun. 9, 2000, http:/ticnetwork.com/container.htm.

* cited by examiner

*Primary Examiner*—Benjamin C. Lee
*Assistant Examiner*—Tai T. Nguyen
(74) *Attorney, Agent, or Firm*—Withrow & Terranova PLLC

(57) ABSTRACT

The present invention includes a tracking device that is associated with a cargo container. The cargo container is used for shipping of goods and materials and is placed into transportation vessels for shipment. The tracking device includes a GPS for receiving positioning information concerning the location of the cargo container and is adapted to transmit the location of the cargo container remotely. Sensor (s) are also operatively associated with the cargo container and tracking device to sense information concerning the surroundings of the cargo container. The tracking device receives this sensor information and deactivates the tracking device when the cargo container is either inside or in proximity to the aircraft.

151 Claims, 14 Drawing Sheets

METHOD AND APPARATUS FOR DETECTING A CONTAINER PROXIMATE TO A TRANSPORTATION VESSEL HOLD

FIELD OF THE INVENTION

The present invention is directed to detecting the entry of a container into a transportation vessel hold and, more particularly, to deactivating a tracking device attached to the container when it enters a transportation vessel hold that is sensitive to frequency signals to prevent any potential interference with the transportation vessel systems.

BACKGROUND OF THE INVENTION

Many shipping companies attach transmitting devices to shipping containers to track their geographic location. This allows the shipping company to determine the geographic location of the container as it moves between the origination and destination points to determine whether the goods inside the container are on time, late, or somehow misplaced. For instance, the container may have been misrouted or been placed on the incorrect airline to reach its destination. The advantages of tracking the position of the goods are many and therefore have become commonplace throughout the shipping industry.

The tracking devices associated with the container transmit and receive various types of communication signals, such as electromagnetic and/or radio frequency signals, for determining the geographic position. A problem occurs when the container with the tracking device is loaded onto a transportation vessel, such as an aircraft, as the signals may potentially cause interference with the aircraft systems. Regulatory agencies, such as the Federal Aviation Administration (FAA), place restrictions on communications signals due to their potential interference with flight systems and communications. Before the present invention, containers with tracking devices could not be loaded onto vessels such as an aircraft because of this potential interference. Containers with tracking systems may also be present in other areas that require intrinsically safe conditions. It is therefore necessary that the tracking device be deactivated while the container is on board the transportation vessel or in an intrinsically safe area.

It has been determined that for a deactivation method, it is inadequate to rely on a person to manually switch off the tracking device when it enters the aircraft. For example, human operators may forget to deactivate the tracking device when the container is entered into the transportation vessel. Additionally, these containers are normally tightly packed into the transportation vessel cargo hold in such a manner that they are not easily accessible once the transportation vessel has been completely loaded. One container with a tracking device still activated that is loaded onto a transportation vessel may require that the entire transportation vessel be unloaded to access and deactivate the trackingdevice. Further, once the container is removed from the transportation vessel at the end of its journey, the tracking device must be reactivated so the container can again be adequately tracked.

As a further consideration, the tracking device must be installed on the container such that it does not interfere with the currently existing cargo handling equipment. This includes placement of the transmitting device in a location such that it is not easily damaged by either the cargo handling equipment or a turbulent aircraft ride.

Thus, there remains a need for a reliable method and system for deactivating the tracking device once it has been loaded onto a transportation vessel such as an aircraft.

SUMMARY OF THE INVENTION

The present invention is directed to a tracking device that is associated with a container for shipping of goods and/or materials. The tracking device receives information regarding the location of the container and such information is communicated remotely for tracking purposes. Sensors are provided to determine if the container is proximate to, being loaded into, or already loaded in transportation vessels (hereinafter, collectively referred to as "proximate") so that the tracking device can be deactivated so as to not interfere with the communications systems of the transportation vessel, such as an aircraft.

There are many different manners in which the present invention senses that the container is proximate to a transportation vessel, any of which can act independently or in cooperation with each other to deactivate the tracking device. Environmental sensors may be used to sense information concerning the surrounding of the container, including but not limited to, reception of positioning information, acoustics, frequencies, pressure, altitude, motion, vibration, capacitance, and imaging. Cooperative marker sensors may also be used by placing them proximately to the transportation vessel in strategic locations such that sensors associated with the container are able to read such markers to determine that the container is proximate to a transportation vessel so that the tracking device can be deactivated. These sensors are also used to determine when the container is no longer proximate to a transportation vessel so that the tracking device can be reactivated.

Transportation vessels may have cargo holds that are shielded from reception of outside signals. In one environmental sensor embodiment, the lack of reception of positioning information inside such a cargo hold may be used to indicate that the container is inside a transportation vessel.

In a second environmental sensor embodiment, acoustic signals unique to a particular type of transportation vessel may be sensed to indicate that the container is proximate to a transportation vessel. The tracking device compares the sensed acoustic signals to predetermined acoustics signals stored in memory to determine if the tracking device is in a transportation vessel and, thus, should be deactivated.

In another environmental sensor embodiment, frequency detection is used. The transportation vessel may emit particular frequencies that are representative of the operation of the vessel. For instance, aircraft AC power systems emit a frequency around the 400 Hz range that may be detected to signify that the container is proximate to the aircraft.

In another environmental sensor embodiment, pressure readings are used. Pressure readings can determine height above sea level which in turn can be used to determine if the container is airborne and, therefore, in a transportation vessel such as an aircraft. If the pressure readings are used in combination with positioning information, the tracking device can determine the container's height above ground level to further ensure that the container is actually airborne (as opposed to above seal level, but still on the ground such as in a mountainous region) before deactivating the tracking device.

In another environmental sensor embodiment, motion and/or vibration of the container is measured. If the container is moved in a certain way or at a certain angle, this may signify that the container is proximate to a transportation vessel. Likewise, transportation vessels may have unique vibrations that can be sensed to determine when the container is proximate to a transportation vessel so that the tracking device can be deactivated.

In another environmental sensor embodiment, capacitance is used to determine if the container is proximate to a transportation vessel. Certain cargo holds of transportation vessels may be constructed of unique materials of known thicknesses that will couple with the container to form a predetermined capacitance when the container is proximate to the transportation vessel. Thus, by determining the capacitance associated with the container, the tracking device can determine whether the container is proximate to a transportation vessel so that the tracking device can be deactivated.

In another environmental sensor embodiment, an imaging sensor may be used to determine the curvature of the container's surroundings. Certain cargo holds for certain transportation vessels may have unique shapes, and, thus, identifiable curvatures, due to the vessel's construction and design. By using an imaging sensor to identify the curvature associated with the container's surroundings, the tracking device can determine whether the container is proximate to a transportation vessel so that the tracking device can be deactivated.

In a first cooperative marker sensor embodiment, an optical sensor is used to read a code marker or other pattern strategically placed proximate to the transportation vessel to signify that the container is proximate to a transportation vessel. Such codes may be one dimensional pattern codes such as a bar code or two dimensional pattern codes. When such a code is read, the tracking device recognizes that the container is proximate to a transportation vessel so that the tracking device can be deactivated. In addition to signifying that the container is proximate to a transportation vessel, such codes may also contain other information, such as the itinerary of the transportation vessel or its journey duration, which gives the tracking device the option of tailoring the reactivation process to occur after the transportation vessel reaches its destination.

In a second cooperative marker sensor embodiment, a capacitance marker sensor is used to read a capacitance marker strategically placed proximate to the transportation vessel to signify that the container is proximate to a transportation vessel. For instance, metal plates may be used as the capacitance marker and placed inside the cargo hold of the transportation vessel where the container will be located. By determining the capacitance associated with the container, the tracking device can identify when the container is proximate to a transportation vessel so that the tracking device is deactivated.

In another cooperative marker sensor embodiment, an ultrasonic marker sensor is used to detect ultrasonic signals to signify that the container is proximate to a transportation vessel. Markers that emit specific ultrasonic signals are placed proximate to the transportation vessel. The tracking device emits a signal and includes an ultrasonic transponder to receive the response to such signal. Because the markers are known to emit specific signals in response to specific signals emitted by the tracking device, the tracking device can identify when such markers are present, signifying that the container is proximate to a transportation vessel so that the tracking device can be deactivated.

In another cooperative marker sensor embodiment, an infrared beacon sensor is used to detect infrared signals to signify that the container is proximate to a transportation vessel. Markers that emit specific infrared signals are placed proximate to the transportation vessel. The tracking device includes an infrared sensor to detect infrared signals. Because the infrared markers are known to emit specific signals, the tracking device can identify when such markers are present, signifying that the container is proximate to a transportation vessel so that the tracking device can be deactivated.

In another cooperative marker sensor embodiment, a frequency beacon sensor is used to detect frequency signals to signify that the container is proximate to a transportation vessel. Markers that emit specific frequency signals are placed proximate to the transportation vessel. The tracking device includes a frequency sensor to detect frequency signals. Because the frequency markers are known to emit specific signals, the tracking device identify when such markers are present, signifying that the container is proximate to a transportation vessel so that the tracking device can be deactivated.

This method may be of particular advantage when combined with the environmental frequency sensor embodiment discussed above if the transportation vessel is an aircraft. Specifically, the frequency beacon may be set to emit frequency signals in the range of 400 Hz, the same frequency range as that emitted by an aircraft's AC power system. The tracking device can include and use the same frequency sensor for both the environmental frequency sensing method and frequency beacon method as a redundancy, without the extra cost of two different types of sensors associated with the tracking device.

In another cooperative marker sensor embodiment, a magnetic marker sensor is used to detect magnetic patterns to signify that the container is proximate to a transportation vessel. Magnetic markers arranged in a specific pattern to form a code are placed proximate to the transportation vessel. The tracking device includes a magnetic marker sensor to detect the magnetic marker pattern. By reading and identifying the expected magnetic marker pattern, the tracking device can determine when the container is proximate to a transportation vessel so that the tracking device can be deactivated.

The tracking device can deactivate the system to varying degrees. The most important deactivation is to deactivate the remote communication device so that transmissions are not made while the container is proximate to a transportation vessel. The tracking device can also deactivate other systems to conserve power and to further diminish potential interference with the transportation vessel's systems. Sensors associated with the tracking device that emit signals may also be deactivated, depending on the particular type of transportation vessel and the strength of the signals emitted.

DETAILED DESCRIPTION OF THE INVENTION

Figure 1:
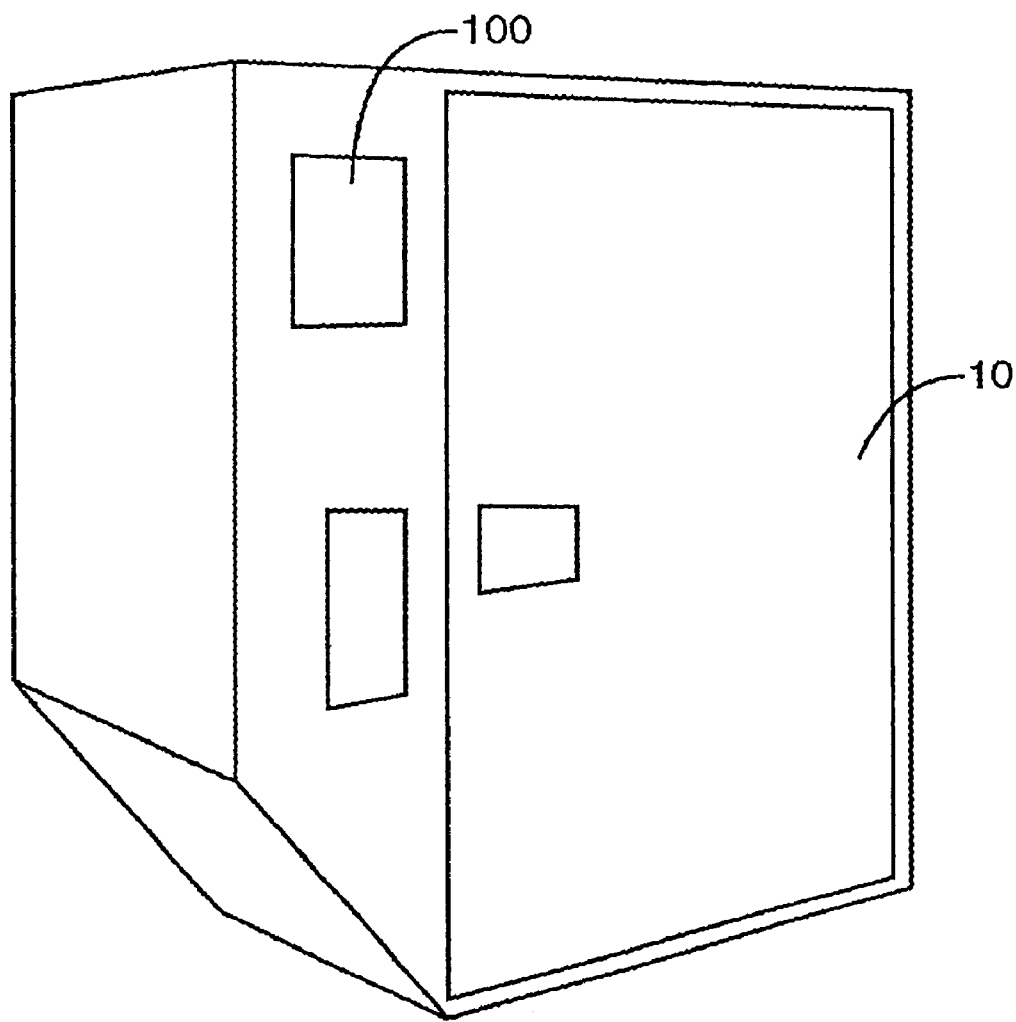
FIG. 1 is a perspective view of a container designed for the cargo hold of an aircraft.

In the following description, like reference characters designate like or corresponding parts throughout the several views. Also, in the following description, it is to be understood that such terms as "forward", "rearward", "left", "right", "upwardly", "downwardly", and the like are words of convenience and are not to be construed as limiting terms.

Referring now to the drawings in general, and to FIG. 1 in particular, it will be understood that the illustrations are for the purpose of describing a preferred embodiment of the invention and are not intended to limit the invention thereto.

Figure 2:
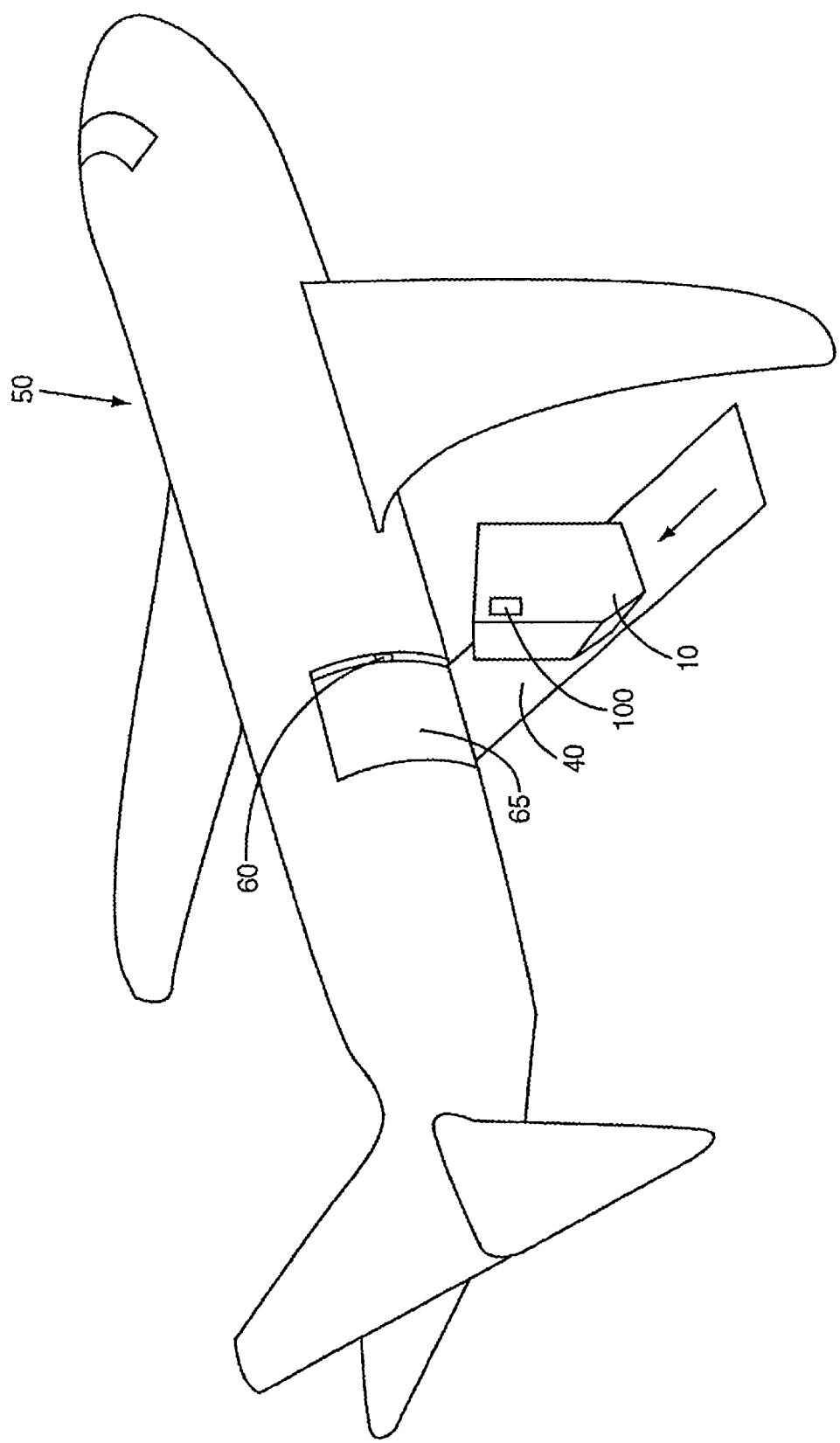
FIG. 2 is a partial perspective view illustrating a container being loaded into the cargo hold of an aircraft.

As illustrated in FIGS. 1 and 2, a container 10 is provided that is especially suited for the cargo hold of an aircraft, such as those containers manufactured and distributed by Envirotainer Group Companies. A tracking device 100 is associated with the container 10 for determining its geographic position during the shipping process. The tracking device 100 may be placed internally within the container 10, or the tracking device 100 may be positioned on an outer surface necessary for communication with a cooperative marker 60 as will be described below. The tracking device 100 is placed in a position such that it will not interfere with or be damaged by the material handling system, generally designated 40.

Container 10 may take a variety of forms depending upon the type of materials and goods being shipped. Container 10 may also be constructed to provide for temperature sensitive materials that range from insulated packaging, refrigeration units using dry ice, and thermostat equipped containers using aircraft power to run refrigeration and heating systems. FIG. 2 illustrates the container 10 being loaded into the loading port 65 of an aircraft 50. The container 10 is equipped to be handled by a material handling system 40, and may include openings for mounting the blades of a forklift or a protective outer layer allowing for moving the container 10 into the aircraft 50. One skilled in the art will understand that there are a plethora of containers and many different types of transportation vessels, such as aircraft, ships, and trains that are all applicable to the present invention.

Figure 3:
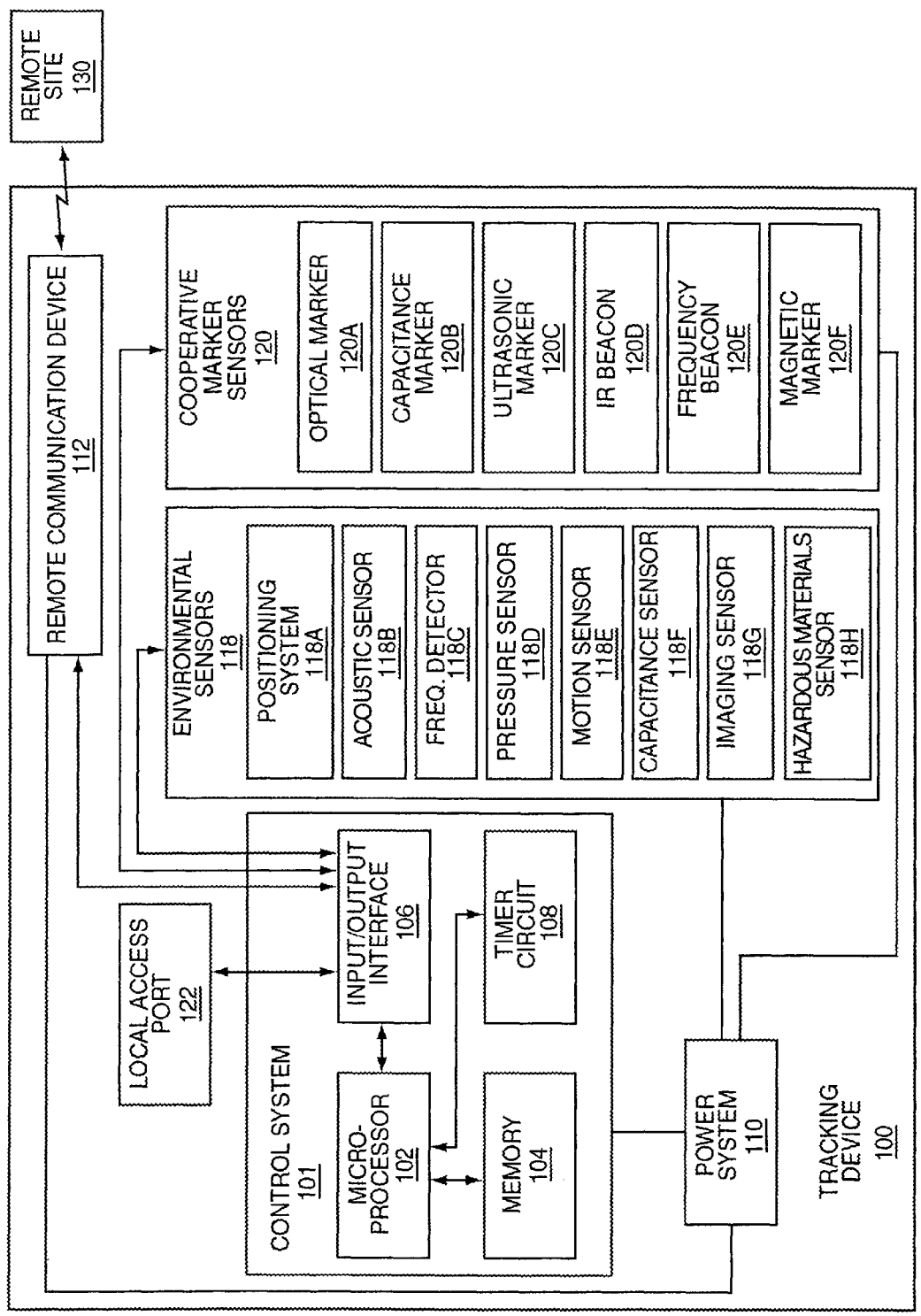
FIG. 3 is a schematic representation of the components of the tracking device of the present invention.

The tracking device 100 is schematically illustrated in FIG. 3. A control system 101 includes a microprocessor 102 operatively connected with a memory 104, an input/output interface 106, and a timer circuit 108. The microprocessor 102 interfaces with devices outside the control system 101 through the input/output interface 106. If the microprocessor 102 needs to carry out instructions or operations based on time, the microprocessor 102 uses the timer circuit 108.

The tracking device 100 also includes a positioning system 118a, also referred to as a global positioning system (GPS) receiver 118a, and the two terms are used interchangeably herein. The GPS receiver 118a receives electronic signals containing positioning information representing the location of the tracking device 100 and, therefore, the location of the container 10. One example of the positioning system 118a is described in U.S. Pat. No. 5,648,763, incorporated herein by reference herein in its entirety The positioning information is received by the microprocessor 102 through the input/output interface 106. The microprocessor 102 may store the positioning information in memory 104. The microprocessor 102 may also send the positioning information received from the positioning system 118a concerning the location of the container 10 to a remote communication device 112. The remote communication device 112 communicates the positioning information to a remote site 130 or other type of host computer. The remote communication device 112 may transmit positioning information by a wired communication such as a telephone modem, or it may transmit such information wirelessly through use of a cellular phone modem. Alternatively, the remote communication device 112 may send out positioning information to the remote site 130 in the form of frequency communication signals to devices such as satellites or radiofrequency devices.

Figure 4:
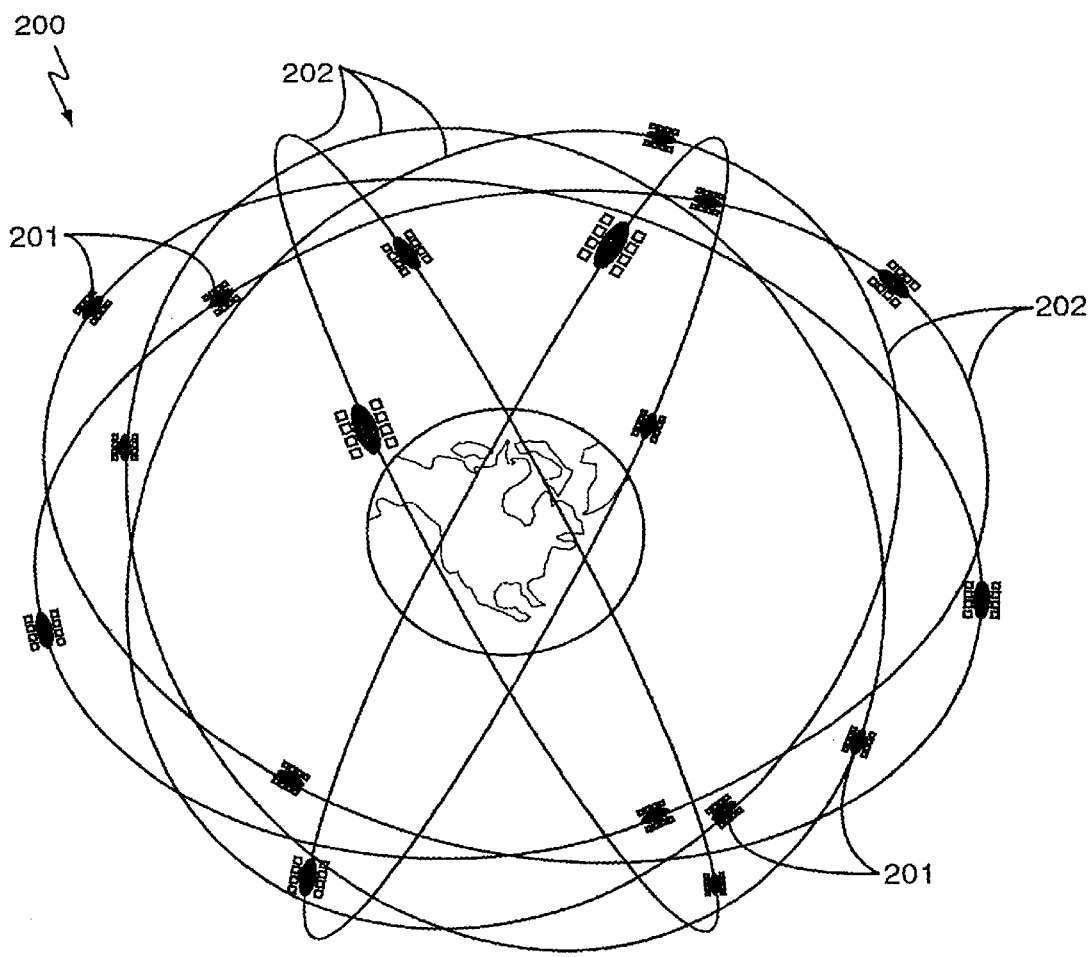
FIG. 4 is a schematic representation of a global positioning system used by the tracking device to determine the geographic position of the container.

FIG. 4 illustrates one embodiment of a GPS system 200 as a space-based radio positioning network for providing users equipped with suitable receivers highly accurate position, velocity, and time (PVT) information. The illustrated space-based embodiment of the GPS system 200 includes a constellation of GPS satellites 201 in non-geosynchronous twelve-hour orbits around the earth. The GPS satellites 201 are located in six orbital planes 202 with four of the GPS satellites 201 in each plane, plus a number of "on orbit" spare satellites (not shown) for redundancy.

GPS position determination is based upon a concept referred to as time of arrival (TOA) ranging. Each of the orbiting GPS satellites 201 broadcasts spread spectrum microwave signals encoded with positioning data and satellite ephemeris information. The signals are broadcast on two essential frequencies at precisely known times and at precisely known intervals. The signals are encoded with their precise time of transmission.

The tracking device 100 receives the signals with a particular type of positioning system 118a called a GPS receiver. The GPS receiver 118a is designed to time the signals and to demodulate the GPS satellite 201 orbital data contained in the signals. Using the orbital data, the GPS receiver 118a determines the time between transmission of the signal by the GPS satellite 201 and reception by the GPS receiver 118a. Multiplying this by the speed of light gives what is termed the "pseudo range measurement" of that satellite. If a clock within the GPS receiver 118a were perfect, this would be the range measurement for that GPS satellite 201, but the imperfection of the clock causes it to differ by the time offset between actual time and receiver time. Thus, the measurement is called a pseudo range, rather than a range. However, the time offset is common to the pseudo range measurements of all the satellites. By determining the pseudo ranges of four or more GPS satellites 201, the GPS receiver 118a is able to determine its location in three dimensions, as well the time offset. Thus, a user equipped with a proper GPS receiver 118a is able to determine his PVT with great accuracy. The GPS receiver 118a in the present invention determines positioning information accurately when three or more satellite signals are received, but it is still possible for the GPS receiver 118a to successfully determine location from positioning information from two or less GPS satellites 201. This technology is well known, such as that disclosed in U.S. Pat. No. 6,031,488, incorporated herein by reference in its entirety.

The tracking device 100 also includes a local access port 122. A computing device such as a laptop computer with the proper software can access the tracking device 100 electronically by connecting to the local access port 122 for reasons described below.

A power system 110 supplies power to tracking device 100 components for executing the tracking functions. The power system 110 is contained within the tracking device 100 so that tracking functions can operate regardless of whether the tracking device 100 is in the presence of an external power source, but the power system 110 may also be connected to the aircraft power once the container 10 is loaded onto the aircraft 50. The microprocessor 102 controls which devices within the tracking device 100 receive power by controlling the distribution of the power system 110.

The sensor(s) 118, 120 may utilize a variety of technologies to deactivate the tracking device 100 when the container 10 is positioned on the aircraft 50. Generally, these technologies may be divided into two types of sensors: environmental sensors 118 and cooperative marker sensors 120. Environmental sensors 118 are those that detect the environment to which the tracking device 100 is exposed in order to determine whether the container 10 is positioned aboard the aircraft 50. Cooperative marker sensors 120 detect a cooperative marker 60 positioned within or in proximity to the aircraft 50 to determine when the container 10 is aboard the aircraft 50. The tracking device 100 may be deactivated in a variety of different manners depending upon the type of sensors 118, 120 employed. Deactivation prevents interference with delicate aircraft systems such as navigational, power, and communication.

Figure 5:
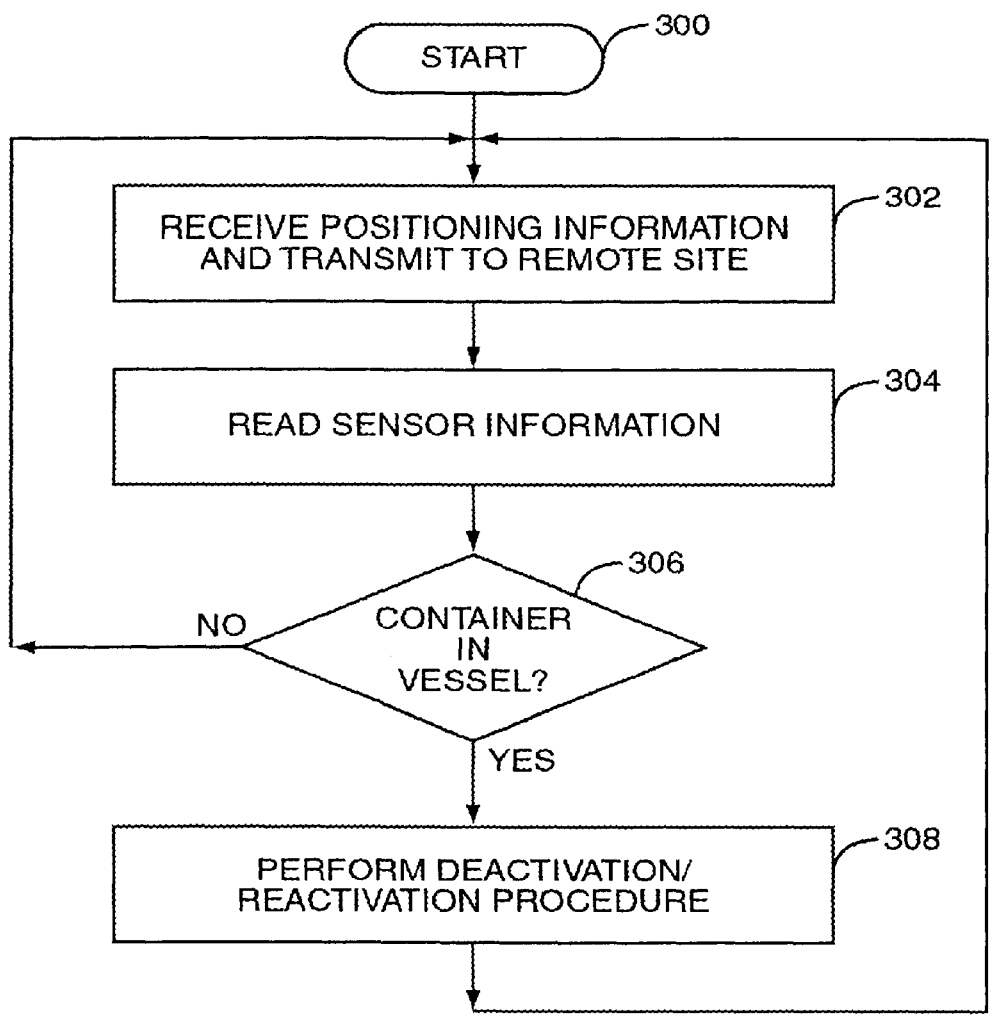
FIG. 5 is a flowchart describing the operation of the tracking device when using sensors.

In the present invention, the term "deactivation" and the like are defined as disabling the systems and elements of the tracking device 100 that may cause interference. This may entail shutting down one or all of the systems depending upon the specifics of each embodiment. FIG. 5 illustrates the basic operation of the present invention when sensors 118, 120 are used to determine if the container 10 is in the aircraft 50 and/or its cargo hold. The operation starts (step 300) and positioning information is received by the positioning system 118a and is communicated through the remote communication device 112 to the remote site 130 (step 302) to allow tracking of the container 10. Information from the sensor(s) 118, 120 are passed through the input/output interface 106 to the control system 101 (step 304). The control system 101 determines, based on the information from the sensor(s) 118, 120, whether the container 10 is in the aircraft 50 and/or its cargo hold (decision 306). If the control system 101 determines that the container 10 is not in the aircraft 50 and/or its cargo hold, the process returns to the beginning (step 300) and the process is repeated. If the control system 101 determines that the container 10 is in the aircraft 50 and/or its cargo hold, the control system 101 performs a deactivation and reactivation procedure (step 308). When the reactivation process is completed, the process returns back to the beginning (step 300) and the process is repeated.

The tracking device 100 may contain either a single sensor 118, 120 or multiple sensors 118, 120 for transferring information to the control system 101 to deactivate the tracking device 100 (step 308). When the container is in the aircraft 50 and/or its cargo hold. If the tracking device 100 includes a second sensor 118, 120 or a multitude of sensors 118, 120, the control system 101 may wait until signals are received from more than one sensor 118, 120 prior to performing the deactivation and reactivation procedure (step 308).

Figure 6:
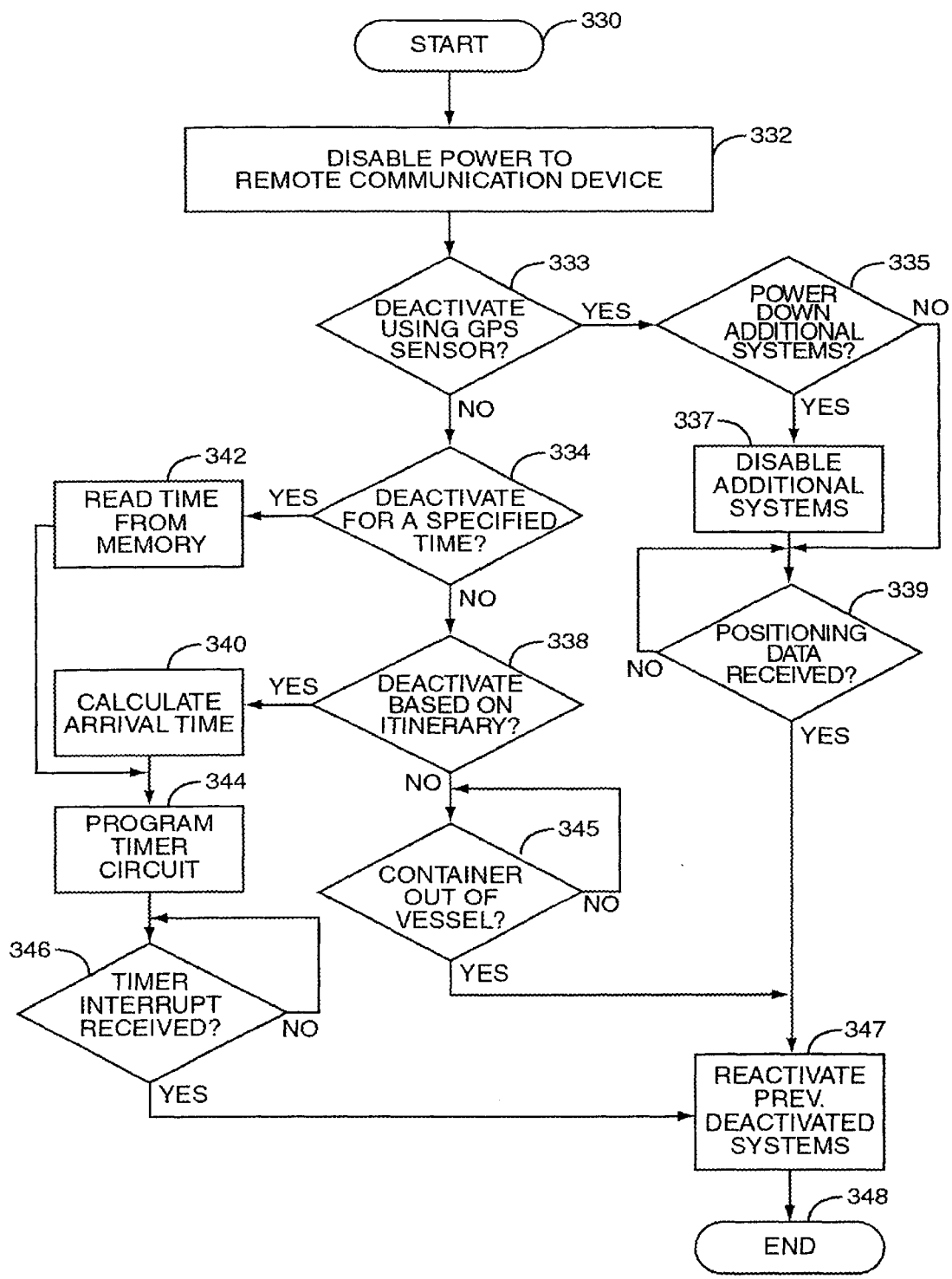
FIG. 6 is a flowchart describing the deactivation and reactivation processes of the tracking device when using sensors.

FIG. 6 describes the deactivation and reactivation process of the tracking system (step 308) described in FIG. 5. The deactivation process begins (step 330). The remote communication device 112 that transmits positioning information regarding the location of the container 10 to the remote site 130 is deactivated (step 332). The control system 101 controls the power system 110 and disables power to the remote communication device 112 (step 332). The control system 101 then determines if the remote communication device 112 has been disabled due to lack of reception of positioning information signals from the GPS receiver 118a (discussed below) (decision 333). If yes, the control system 101 reads memory 104 to determine if any additional systems in the tracking device 100 should be disabled (decision 335), and such disabling is carried out if programmed (step 337). The control system 101 then continually checks to see if positioning information has been received by the GPS receiver 118a until positioning information signals are received (decision 339). The tracking device 100 is able to perform this function since the deactivation process does not deactivate the GPS receiver 118a. When positioning information is received successfully again by the GPS receiver 118a, the tracking device 100 is reactivated and resumes the transmission of positioning information concerning the location of the container 10 to the remote site 130 (step 308 in FIG. 5).

If the control system 101 determines that deactivation was not a result of the remote communication device 112 failing to receive positioning information signals from the GPS receiver 118a (decision 333), the control system 101 determines if the tracking device 100 is to be disabled for a specified period of time (decision 334). If yes, the control system 101 reads the specified time from memory 104 (step 342) and programs the timer circuit 108 (step 344). The control system 101 waits until the timer circuit 108 indicates the specified time has lapsed (decision 346) before the tracking device 100 reactivates previously deactivated systems in the tracking device 100 including the remote communications device 112 (step 347), and ends (step 348), returning back to FIG. 5 (step 308).

If the control system 101 determines that the tracking device 100 is not to be deactivated for a specified period of time (decision 334), the control system 101 determines if the deactivation period should be based on the itinerary of the container 10 (decision 338). For instance, the desired period of deactivation may extend until the aircraft 50 is scheduled to land and/or reach its final destination. If the answer to itinerary-based deactivation is yes (decision 338), the control system 101 calculates the arrival time (step 340) and programs the timer circuit 108 (step 344). The control system 101 waits until the timer circuit 108 indicates the arrival time has passed (decision 346) before the tracking device 100 reactivates previously deactivated systems in the tracking device 100, including the remote communications device 112 (step 347), and ends (step 348), returning back to FIG. 5 (step 308).

If the control system 101 determines that the deactivation should not be based on the itinerary of the container 10 (decision 338), the control system 101 determines if the container 10 is outside of the aircraft 50 (decision 345) by checking status of sensor(s) 118,120 until the container 10 is actually outside the aircraft 50 at which time the tracking device 100 reactivates previously deactivated systems in the tracking device 100, including the remote communications device 112 (step 347), and ends (step 348), returning back to FIG. 5 (step 308).

During the deactivated state, the control system 101 may deactivate all elements and only maintain enough power to periodically detect the container 10 position. Alternatively, the control system 101 may deactivate only those elements that may interfere with the aircraft systems, such as the remote communication device 112 and the positioning system 118a, and maintain the activated state for the other components.

Alternatively, the control system 101 may send a location signal through the remote communication device 112 such that the tracking party will know the last available geographic location prior to deactivation. The control system 101 may also remain in an activated state for a predetermined period of time until deactivation. The predetermined period of time provides for the assumption that the container 10 will be placed onto the aircraft 50 some time before takeoff and that there will be spare time in which interference with aircraft systems is not an issue.

Environmental Sensors

The various types of environmental sensors 118 include GPS system 118a, acoustic sensor 118b, frequency detector 118c, barometric pressure sensor 18d, motion sensor 118e, capacitance sensor 118f, and/or imaging emitter and detector 118g. Each of these environmental sensors 118 detects when the container 10 is placed onto the aircraft 50 or is about to be placed onto the aircraft 50 and is used for executing step 304 in FIG. 5, the logic of which has been previously discussed above. Additionally, more than one type of environmental sensor 118 may be used individually or in combination to make this detection.

GPS System

When the container 10 with tracking device 100 is placed into the aircraft 50, the satellite signals may be blocked by the aircraft 50 and may not reach the GPS receiver 118a. The GPS receiver 118a communicates to the control system 101 that the signals are not being received, which the control system 101 equates to the container 10 being placed into the aircraft 50. As the tracking device 100 is being loaded into the aircraft 50 as illustrated in FIG. 2, the GPS receiver 118a may receive only a limited number of signals or positioning information from the satellites 201. The "one-sided" signal reception is a result of some of the satellite positioning information being blocked by the aircraft 50, while others still reach the GPS receiver 118a. Therefore, the control system 101 may identify the container 10 as being placed into the aircraft 50 if only one or two satellite signals are received by the GPS receiver 118a. The "one-sided" signal reception may be the primary indication for the control system 101 to deactivate, or it may be a redundant check also requiring a full loss of signals prior to deactivation.

Acoustic Sensor

The tracking device 100 may be able to determine if the container 10 is in the aircraft 50 by detecting characteristics of the sound and vibration in the aircraft 50. An aircraft 50 with jet engines, for example, tends to produce a substantial amount of vibration. This vibration is radiated in the form of sound waves and is coupled to the aircraft 50 structure on which the engines are mounted. Detection of the container 10 in the aircraft 50 may be accomplished by detecting this sound and vibration. An example of such a sensor is described in U.S. Pat. No. 5,033,034, incorporated herein by reference in its entirety. An acoustic sensor 118b is able to permit the tracking device 100 to monitor the operation of the aircraft 50 by detecting distinctive sounds made by aircraft using microphones to capture sounds made in the air and through the body of the aircraft 50.

Figure 7:
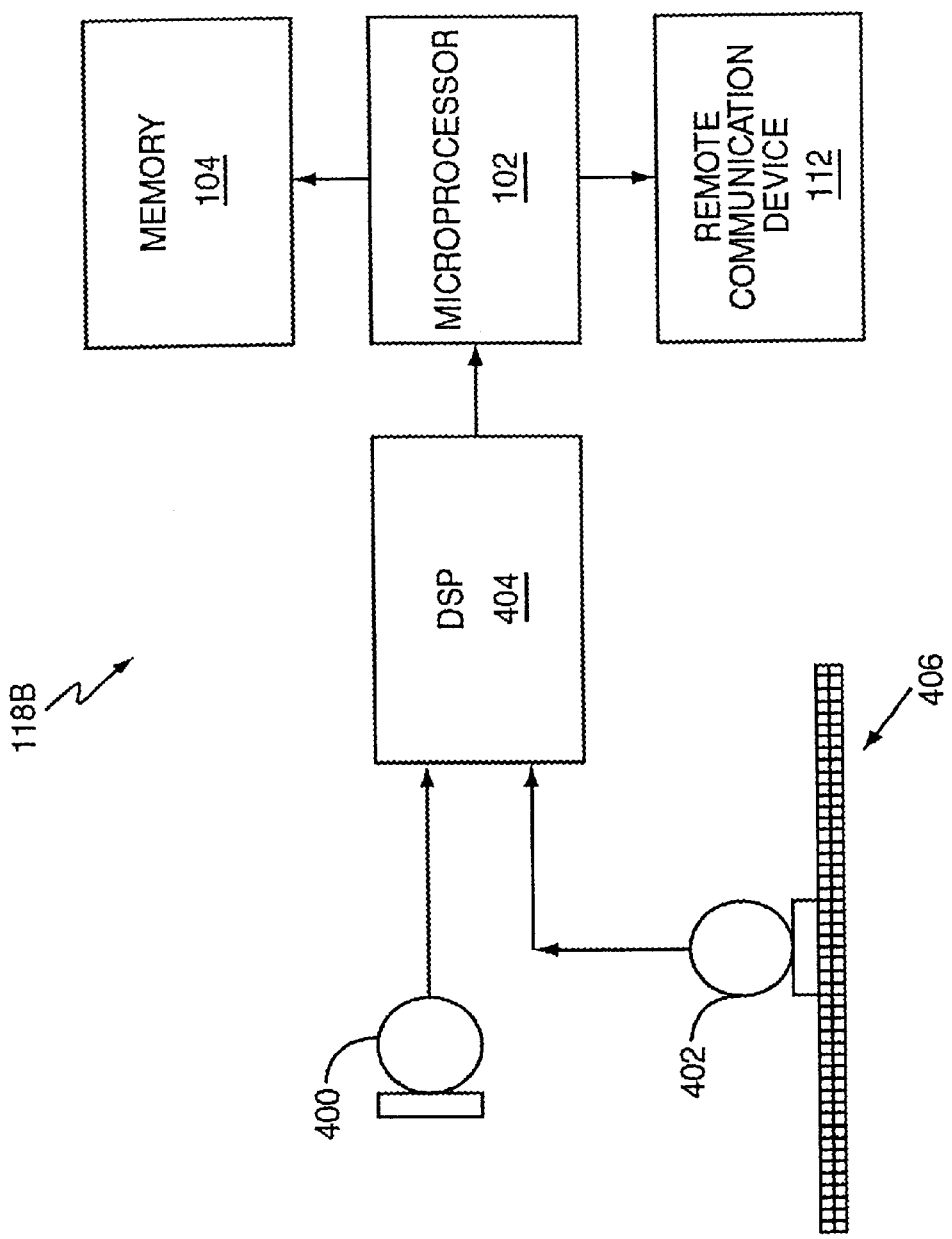
FIG. 7 is a schematic illustration of an acoustic sensor.

FIG. 7 illustrates a block diagram for an acoustic sensor 118b in particular. An air microphone 400 is placed in the aircraft 50 to detect the substantial engine sounds when the aircraft 50 is operating, such as during the pre-flight checks, taxi, and takeoff. The signals from the air microphone 400 are coupled to a digital signal processor (DSP) 404 for processing. Additionally, a contact microphone 402 may be provided and placed in contact with the aircraft 50 structure to detect vibrations within the aircraft 50 with the signals from the contact microphone 402 also coupled to the DSP 404. The DSP 404 is a processor especially suited for processing of numeric applications. In the present invention, the DSP 404 takes the signals from both the air microphone 400 and the contact microphone 402 and runs a Fast Fourier Transform (FFT) on the signals to convert the signals from the time domain to the frequency domain. A modified-FFT may also be used that achieves adequate results for most purposes. Once the signals are represented in the frequency domain, this representation is communicated to the microprocessor 102 of control system 101 via input/output interface 106 to compare the frequency and amplitude of the detected signal pattern with that of a pre-defined jet engine and/or aircraft 50 engine signal pattern stored in memory 104. Deactivation results when the signal patterns match or fall within a predefined range.

Frequency Detector

The tracking device 100 may also be able to determine if the container 10 is in an aircraft 50 by detecting frequencies emitted by the aircraft 50 during its normal operation. An aircraft 50 with jet engines, for example, may produce specific frequencies during operations, such as take off, landing, taxiing, and preflight checks. Detection of the container 10 in the aircraft may be accomplished by detecting specific emitted frequencies that are unique to aircraft 50.

Figure 8:
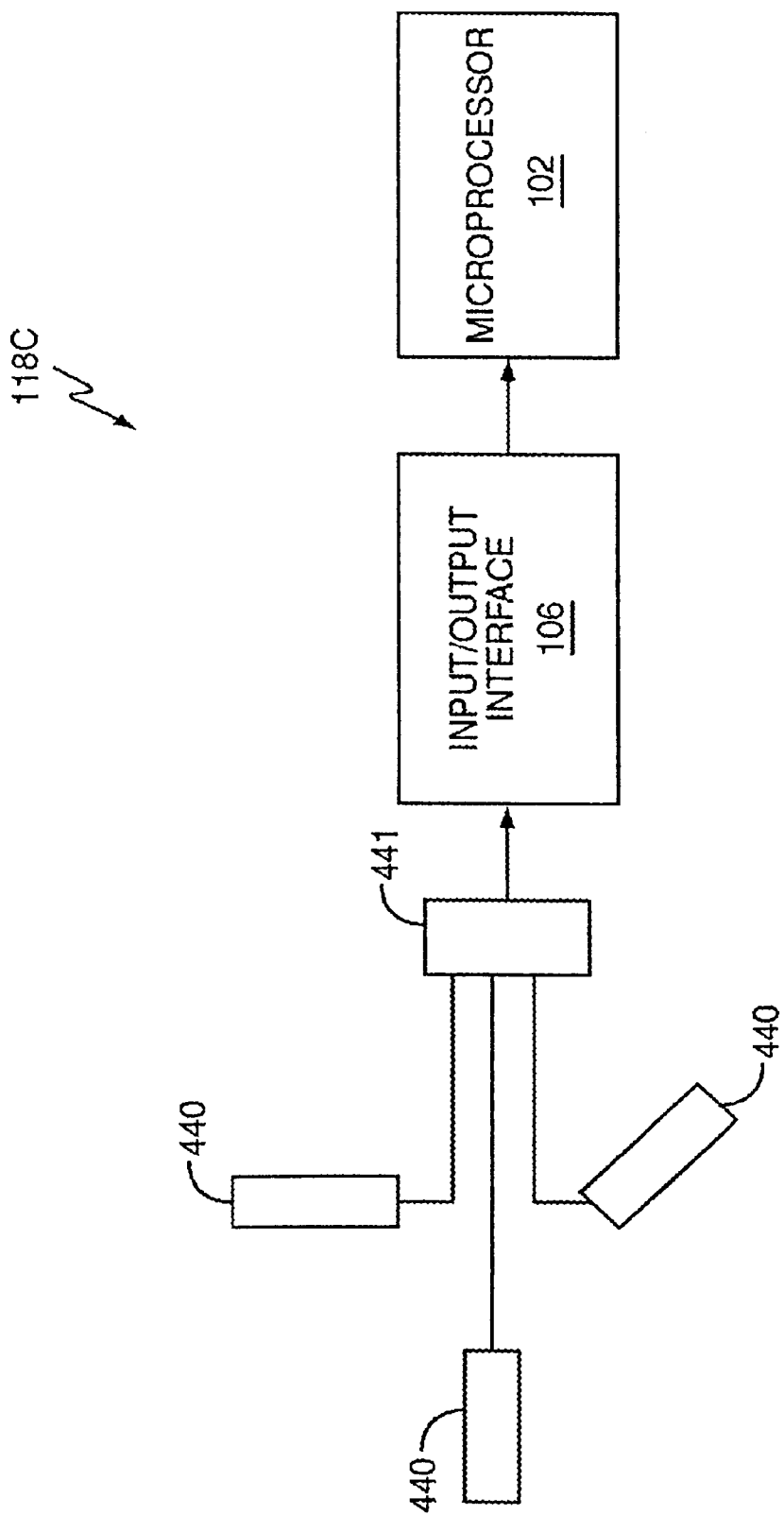
FIG. 8 is a schematic illustration of a frequency detection sensor.

FIG. 8 illustrates a frequency detector 118c according to one preferred embodiment for detecting a signal in the range of 400 Hz. Aircraft power systems use an AC 400 Hz power distribution system that is somewhat unique to aircraft 50, as described in U.S. Pat. No. 5,835,322, incorporated herein by reference in its entirety. A frequency detector that detects a signal at approximately 400 Hz may indicate that the container 10 is on the aircraft 50 and that the tracking device 50 should be deactivated in accordance with the deactivation process.

The preferred embodiment includes three receiving elements 440 orthogonal to each other in three dimensions for use as the frequency detector 118c. The receiving elements 440 may be coils with tuned circuits to detect the desired frequency, or magnetometers designed to sensitively measure AC field strengths, both of which are well known and commonplace.

The purpose of including more than one receiving element 440 and placing a plurality of receiving elements 440 orthogonal to each other is to create an orientation-independent receiving structure to ensure that signals are picked up regardless of the orientation of the container 10 and/or the frequency detector 118c. In a preferred embodiment, three receiving elements 440 are placed orthogonally to each other to create detection devices in all three dimensions. A summer 441 sums the squares of the signal patterns from the receiving elements 440 to eliminate any nulls. In this manner, there is always a signal generated from at least one receiving element 440 that is not null, thereby making the frequency detector independent of orientation.

The summed signals from the summer 441 are received by the control system 101 through the input/output interface 106. If the control system 101 detects a significant signal from the receiving elements 440 that are tuned to receive 400 Hz signals, the control system 101 is programmed to recognize that the container 10 is in the aircraft 50 and to perform the deactivation procedure.

A spectrum analyzer may be used as a frequency detector 118c to determine the presence of a particular frequency signal in a manner such as described in U.S. Pat. No. 3,418,574, incorporated herein by reference in its entirety. The spectrum analyzer scans a band of signal frequencies in order to determine the frequency spectrum of any signal emitted by the aircraft 50. There are other methods of detecting particular frequency signals so as to provide a frequency sensor 118c, and the preferred embodiments are not intended to limit the present invention from using such other methods.

It is also noted that other frequency signals may be emitted when the container 10 is on an aircraft 50 or proximate to an aircraft 50, such as at an aircraft field. Aircraft towers or other communication devices may emit FM signals that can be detected by the frequency detector 118c to indicate that the container 10 is either in an aircraft 50 or proximate to an aircraft 50 such that the deactivation process should be performed. Therefore, the present invention is not limited to detection of any specific frequency signals and the signals do not necessarily have to be emitted from the aircraft 50 itself.

Pressure Sensor

A barometric pressure sensor 118d may be used in combination with the GPS receiver 118a for determining when the container 10 is positioned within an aircraft 50. The barometric pressure sensor 118d determines the air pressure being exerted on the container 10 as it moves during the shipping process. Various types of pressure sensors 118d to determine altitude are available, such as that described in U.S. Pat. No. 5,224,029, incorporated herein by reference in its entirety, and the present invention is not limited to any particular type of pressure sensor 118d.

The positioning information received by the GPS receiver 118a indicates the geographic position of the container 10, but does not indicate the height of the container 10 above sea level. A barometric pressure sensor 118d may be used to ascertain the height of the container 10 above sea level, but it cannot by itself determine whether the height above sea level is still on the ground or in the air. For instance, the city of Denver, Colo. has a ground level that is already approximately one mile above sea level. A reading by the barometric pressure sensor 118d attached to a container 10 will not by itself indicate the height above ground level. Therefore, it is advantageous to use the altitude indication from the barometric pressure sensor 118d, in combination with the positioning information from the GPS receiver 118a, is used to ascertain the height of the container 10 above ground level and, thereby, to determine whether the container 10 is in an aircraft 50.

Figure 9:
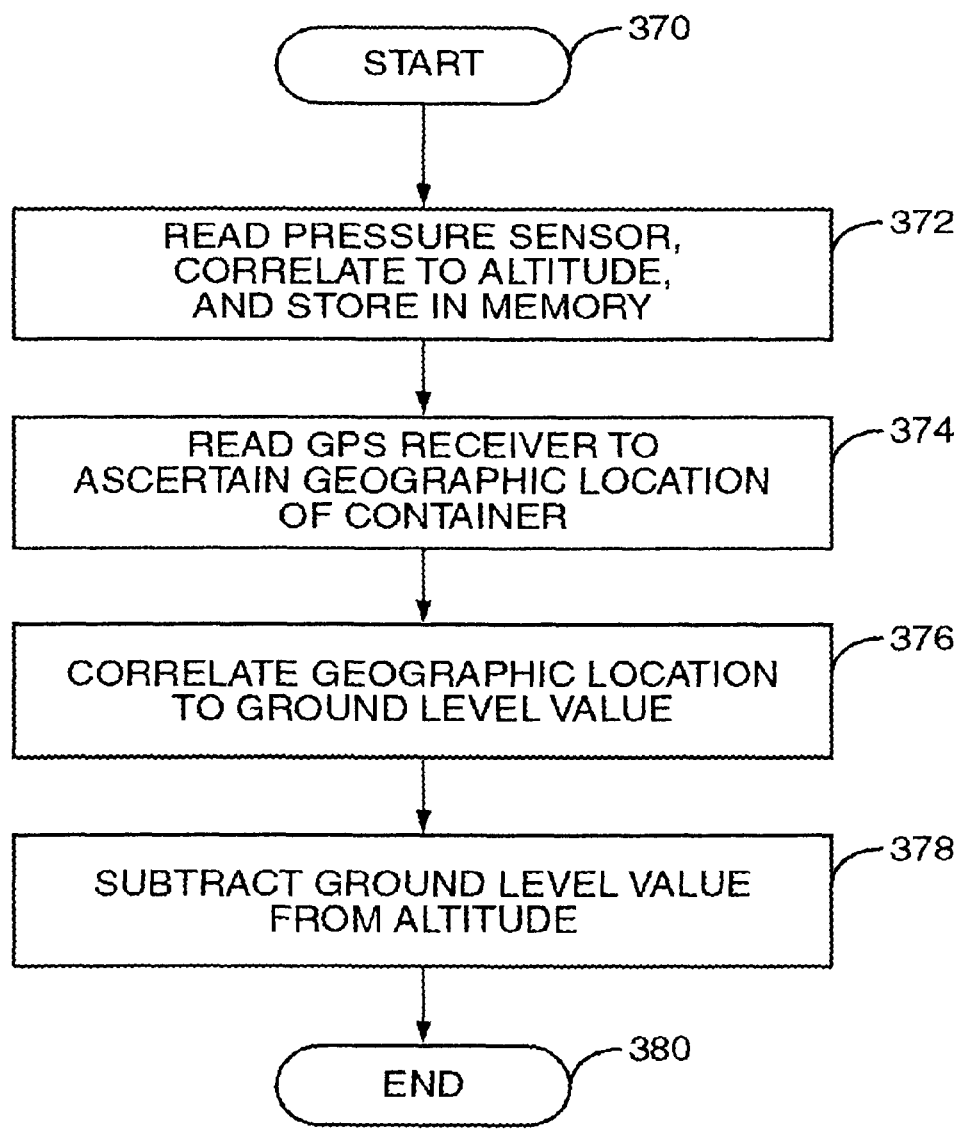
FIG. 9 is a flowchart describing the use of a pressure sensor used to determine if the container is in an aircraft.

FIG. 9 illustrates the barometric pressure sensor 118d operation to determine height of the container 10 above ground level. The operation begins (step 370), and the control system 101 determines the reading from the barometric pressure sensor 118d to correlate such reading to altitude and stores such in memory 104 (step 372). The control system 101 next reads the positioning information from the GPS receiver 118a to ascertain the geographic location of the container 10 (step 374). The control system 101 determines the approximate ground level value by correlating the particular geographic region determined by the positioning information received from the GPS receiver 118a to data either stored in memory 104 or also received remotely by the GPS receiver 118a, and the control system 101 stores the approximate ground level value in memory 104 (step 376). The control system 101 subtracts the ground level from the altitude previously stored in memory 104 to determine the height of the container 10 above ground level (step 378). If this value is greater than zero, the container 10 is above ground level and may be in an aircraft 50. The process ends (step 380) and returns back to FIG. 5 in which the tracking device 100 decides if the container 10 is in the aircraft 50 (decision 306) by determining if the container 10 is above ground level. The control system 101 may perform the deactivation procedure (step 308) when the difference reaches some minimal value since topologies can vary in any given area. In one embodiment, this minimal value is 200 feet.

Motion Sensor

A movement or motion sensor 118e may be used for determining when the container 10 is either being moved, jostled, or placed at an angle. There are many different motion and acceleration sensors 118e that can be used to detect movement and/or acceleration of the container 10 and/or an aircraft 50. For instance, U.S. Pat. No. 5,033,824, incorporated herein by reference in its entirety, describes a vibration/acceleration sensor that is fixed to a casing to measure the vibrations. Such a sensor could be mounted to the body of an aircraft 50 to perform the same functionality. A piezoelectric device is used to detect mechanical vibration and to generate an electrical charge representative of such vibration. The electrical charge is read by the control system 101 through the input/output interface 106 and compared with a predetermined value in memory 104 to determine whether the container 10 is in an aircraft 50 and, thus, whether the deactivation function should be performed as described above in FIG. 6.

Alternatively, or additionally, a mercury switch may be used as a movement sensor 118e to indicate if the container 10 is positioned at an angle. When the container 10 is loaded into the aircraft 50, the container 10 is placed at an angle with respect to the ground when placed on the conveyor system 40, as illustrated in FIG. 2. The mercury switch tilts and causes the mercury liquid to either become open or closed, thereby indicating movement of the container 10. The control system 101 receives this signal from the movement sensor 118e through the input/output interface 106, thereby indicating that the container 10 is at an angle and being loaded into an aircraft 50. The control system 101 can then initiate the deactivation and reactivation procedures as described above in FIG. 6.

Capacitance Sensor

The tracking device 100 can determine if the container 10 is in an aircraft 50 by using a capacitance sensor 118f to detect the capacitance change of the container 10. When the container 10 is placed into an aircraft 50, the container 10 is placed into the cargo hold. The container 10 may be constructed to conform to the dimensions of the cargo hold to reduce or eliminate any non-usable space. As such, the containers 10 are often placed in proximity to or against the inner walls of the cargo hold. The body of the aircraft 50 may be made out of special materials with defined thicknesses and other characteristics that affect the capacitance of the container when placed in close proximity thereto. The tracking device 100 could include a capacitance sensor 118f to sense the capacitance of the container 10. One such sensor is described in U.S. Pat. No. 4,219,740, incorporated herein by reference in its entirety, that describes using a variable inductance/capacitance measuring device to monitor the proximity of a target object.

In the present invention, the aircraft 50 itself is the target object. The container 10 in the preferred embodiment is constructed out of steel and, therefore, is conductive. The inductance of the measuring device changes in accordance with the proximity of the container 10 to the body of the aircraft 50. This change is compared by the control system 101 to values stored in memory 104 representative of the conductance of an aircraft 50 body (to which the container 10 would be proximate if loaded onto the aircraft 50), to determine when the container 10 is loaded onto the aircraft 50 so as to initiate the deactivation and reactivation procedures as described above in FIG. 6.

Imaging Sensor

Figure 10:
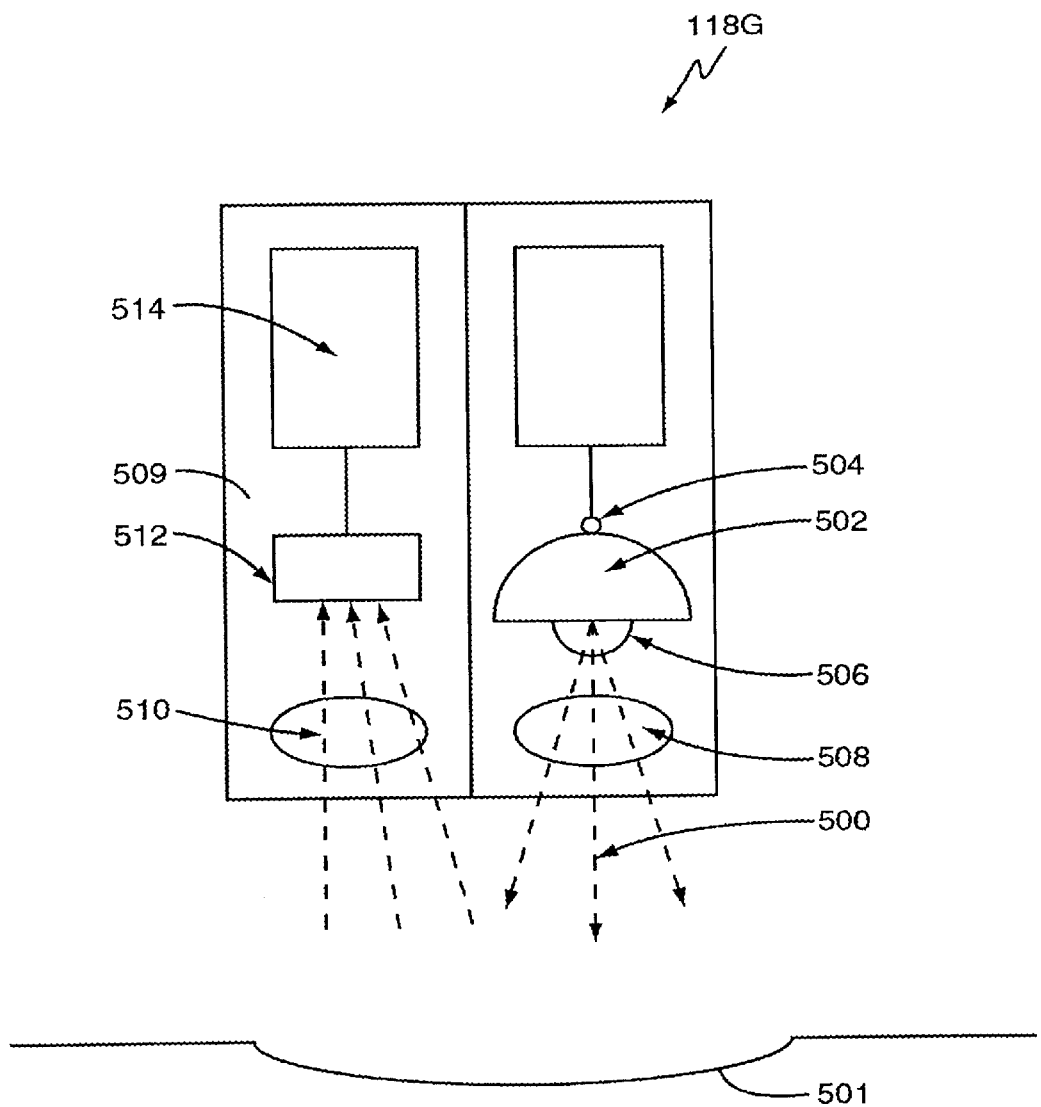
FIG. 10 is a schematic illustration of an imaging emitter and detector.

The tracking device 100 can also determine if the container 10 is in an aircraft 50 by detecting the curvature of the cargo hold. Aircraft cargo holds have distinctive shapes due to the curvature of the body of the aircraft 50. An imaging sensor or light sensor 118g can emit a spectrum of light during the shipment of the container and read the reflection to determine if the container 10 has been placed in an area containing a curvature like that of the cargo hold. An example of an imaging sensor 118g comprises an imaging emitter 506 and detector 509, as illustrated in FIG. 10 and described below. The imaging sensor 118g uses an imaging emitter 506 to scan the area of interest with a beam 500. The scanning is achieved by moving a mirror, such as a reflector 502 that is rotated about a rotational axis 504. The light source emitted by the imaging/emitter 506 may be a laser or laser diode. An optical lens 508 converts the light into a beam 500. The beam 500 scans the aircraft surface 501 and the reflected light passes through an imaging detector 509 that is comprised of an optical lens 510 that produces an image of the scanned area on photo detectors 512, which generate electrical signals representing the surface 501. A detecting system 514 then determines the pattern or width of the electrical signals to translate such signals to information.

The imaging emitter 506 continues to emit a spectrum of signals such as infrared signals from the container 10 during shipment. The imaging detector 509 receives the reflection of the light emitted by the imaging emitter 506. Bends or curves in a reflected surface bend or curve the light received from by the imaging detector 506. The control system 101 continually monitors the reading from the imaging detector 506 and compares it to a predefined reading stored in memory 104. If the image received by the imaging detector 509 indicates that the container 10 is in an aircraft 50 cargo hold, the control system 101 carries out the deactivation and reactivation process as described above in FIG. 6.

Cooperative Marker Sensors

Cooperative marker sensors 120 detect markers placed within or proximate to the aircraft 50. As illustrated in FIG. 2, a cooperative marker 60 is positioned immediately within or proximate to the aircraft loading port 65. A number of cooperative markers 60 may be positioned within the aircraft 50 located at various positions. Additionally, more than one type of cooperative marker 60 may be used in combination within a single aircraft 50. Cooperative marker sensors 120 are preferably positioned on an outer portion of the container to detect the cooperative markers 60, which are typically placed within the aircraft 50, but may be placed slightly away from or proximate to the aircraft 50 to be encountered by the container 10 before the container 10 is loaded into the aircraft 50.

The cooperative sensors 120 may be active devices that pick up signals from emitters placed purposely in the aircraft 50 or its cargo hold. Alternatively, the cooperative sensors 120 may be passive devices that differ from active devices in that emitters are not placed in the aircraft 50 or its cargo hold. Instead, for passive devices, cooperative markers are placed in the aircraft 50 or its cargo hold that are not active devices, such as emitters, but simply represent codes or markings that are detected by passive cooperative sensors 120 to relay information.

Cooperative marker sensors 120 may include optical marker sensor 120a, capacitance marker sensor 120b, ultrasonic marker sensor 120c, infrared beacons 120d, frequency beacons 120e, and/or magnetic marker sensor 120f. Each of the cooperative markers 60 sensed are used for executing step 304 in FIG. 5, the logic of which has been previously discussed above.

Optical Marker Sensor

Figure 11:
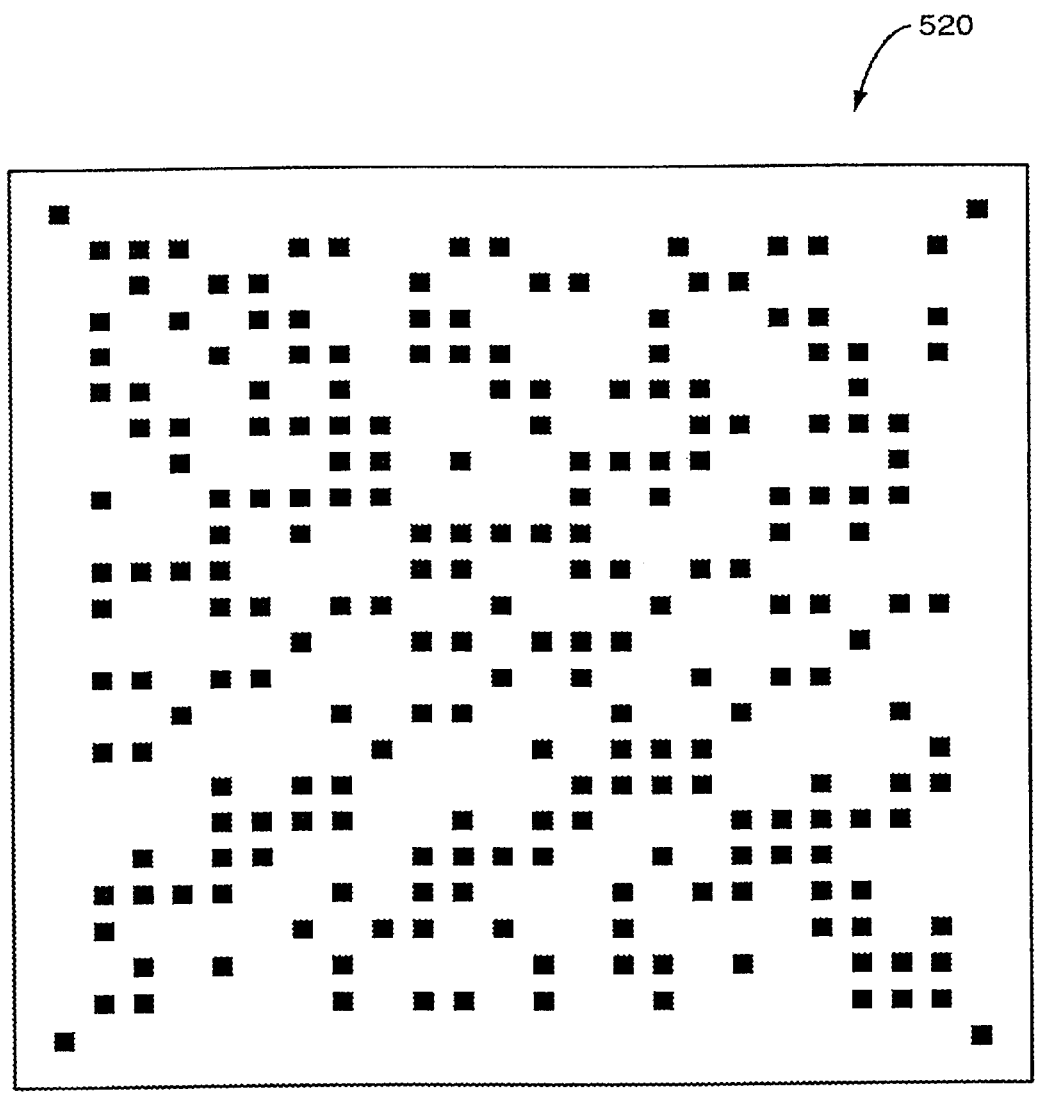
FIG. 11 is a schematic representation of a Snowflake code.

An optical marker sensor 120a may be used by the tracking device 100 to sense the presence of a cooperative marker 60 that is positioned within the aircraft 50. In one embodiment, the optical marker sensor 120a includes an infrared illuminator using a bank of LED's or laser similar to that described above in FIG. 10. A cooperative marker 60 is positioned within the aircraft 50 that contains specific coded information indicating that the container 10 is being loaded into the aircraft 50 or is about to be loaded into an aircraft 50. This cooperative marker 60 code could be a bar code or the code illustrated in FIG. 11 marketed under the trademark Marconi Snowflake™ 520 by the assignee of the present invention. The article entitled "The Marconi Data Systems Snowflake Code" discusses the advantages and features of the Marconi Snowflake code 520 and is incorporated herein by reference in its entirety. The optical marker sensor 120a may also distinguish reading the cooperative marker 60 from left to right or top to bottom depending on the alignment of the cooperative marker 60 to indicate the direction of movement of the container 10 with respect to the cooperative marker 60.

Similar to that illustrated in FIG. 10 above, the optical marker sensor 120a emits spectrum signals such as an infrared signal or laser signal from the container 10 during shipment. The optical marker sensor 120a receives the reflection of the light emitted to determine if the optical marker sensor 120a is picking up information from the Marconi Snowflake code 520. When information is detected by the optical marker sensor 120a from the Marconi Snowflake code 520, the optical marker sensor 120a passes such information to the control system 101 through the input/output interface 106. The control system 101 determines whether the information read from the Marconi Snowflake code 520 indicates that the container 10 is being loaded or has been loaded into an aircraft 50, in which case the control system 101 carries out the deactivation and reactivation process.

Capacitance Marker Sensor

Figure 12:
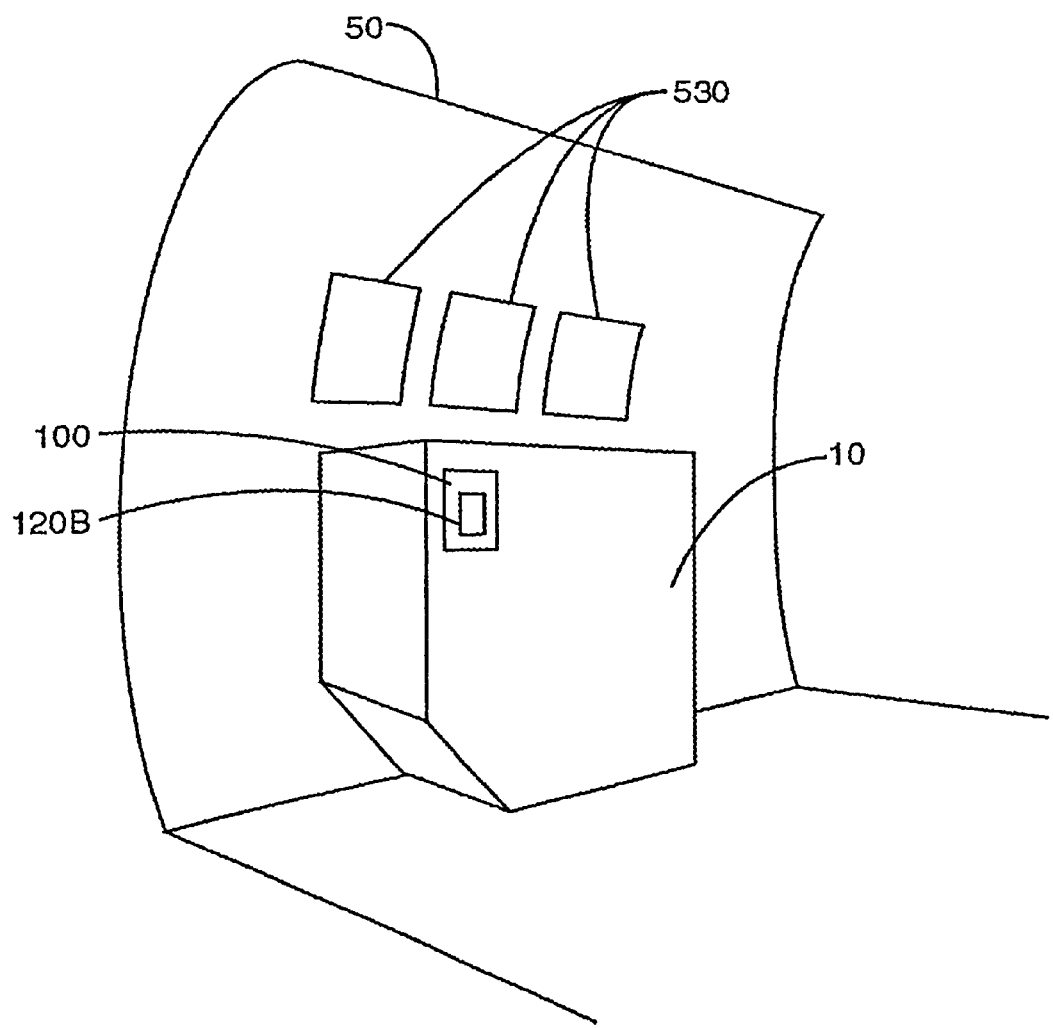
FIG. 12 is a schematic representation of capacitance marker sensor.

FIG. 12 illustrates metal plates or markers 530 that are placed on the aircraft 50 body proximate to the container 10 when it is loaded into the aircraft 50 cargo hold. In this manner, a capacitance marker sensor 120b can detect the change in capacitance to indicate that the container 10 is loaded into the aircraft 50. The sensing process for this method is the same as that described above for capacitance sensor 118f. In this particular method, plates 530 placed into the aircraft 50 may allow better determination of the change in capacitance proximate to the container 10 by the control system 101.

Ultrasonic Marker Sensor

Figure 13:
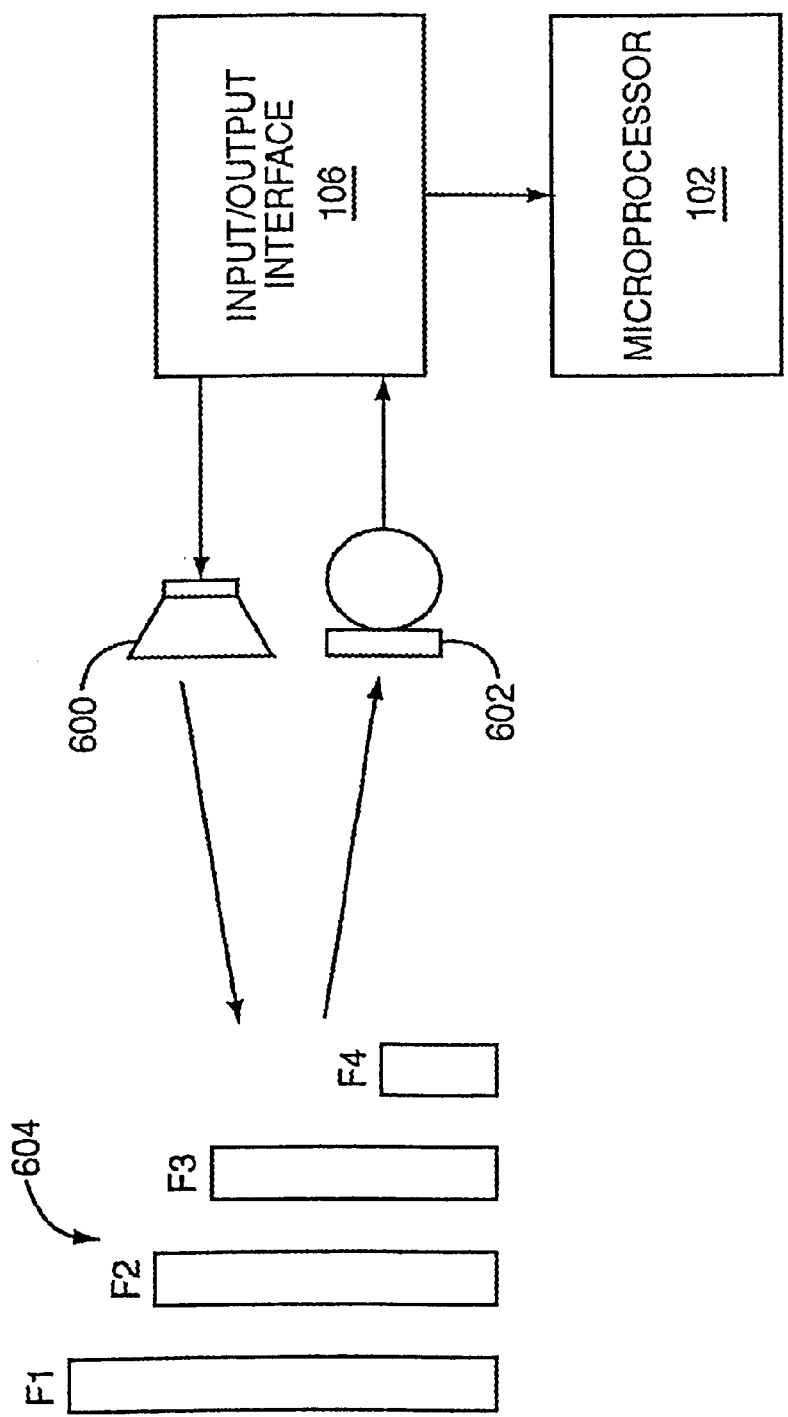
FIG. 13 is a schematic representation of an ultrasonic transponder.

The ultrasonic marker sensor arrangement 120c senses the presence of a cooperative marker 60 that resonates at particular frequencies. In the preferred embodiment, as shown in FIG. 13, the ultrasonic marker sensor 120c is an ultrasonic transponder 602 that receives ultrasonic signals at certain defined frequencies. The tracking device 100 also includes an ultrasonic emitter. The tracking device 100 emits frequencies using ultrasonic emitter 600 and picks up response frequencies received by the ultrasonic transponder 602. If specific frequencies indicative of an aircraft are received by the ultrasonic transponder 602 in response to frequencies emitted by the ultrasonic emitter 600, then the container 10 is in the aircraft 50.

In a preferred embodiment, pipes 604 with specific resonant frequencies are placed in the aircraft 50. The control system 101 causes the ultrasonic emitter 600 to transmit frequencies across a band in which resonant frequencies are expected to occur. The control system 101 receives response frequencies from the ultrasonic transponder 602 in response to signals emitted by the ultrasonic emitter 600 and compares them in memory 102 to expected signals to be received when the container 10 is in an aircraft 50 with pipes 604. If the control system 101 receives signals from the ultrasonic transponder 602 that are expected when the container 10 is in the aircraft 50, this indicates that the container 10 is in an aircraft 50, in which case the control system 101 carries out the deactivation and reactivation process. Although the reactivation procedure for this method requires transmission of signals to determine if the container 10 has been removed from the aircraft 50, such signals should not pose a problem with the aircraft 50 systems since such transmissions are low power and are designed for close range detections.

Alternatively, the control system 101 may cause the ultrasonic emitter 600 to transmit bursts of acoustic noise covering the desired band of frequencies. When the transmitted signals are stopped, the pipes 604 will continue to resonate at their resonant frequency and the control system 101 will be able to continue to receive their response signals through the ultrasonic transponder 602.

Additional ultrasonic marker sensors 118c and sensing systems such as that described in U.S. Pat. No. 4,779,240, incorporated herein by reference in its entirety, can be used to sense the frequency response of emitted signals to markers placed purposely in an aircraft 50 holding the container 10, and the present invention is not limited to any particular type of ultrasonic marker sensor 118c or sensing system.

Infrared Beacon Sensor

The infrared sensor 120d is an active sensor that senses the presence of a cooperative marker 60 that emits a specific beacon of light like that described in U.S. Pat. No. 5,165,064, incorporated herein by reference in its entirety. The tracking device 100 includes an infrared sensor 120d that detects infrared signals emitted by an infrared beacon marker placed in the aircraft 50.

The infrared beacon marker placed in the aircraft 50 emits a light in the cargo hold area. The infrared sensor 120d detects lights emitted in its path and transmits signals to the control system 101 through the input/output interface 106. If the control system 101 receives signals from the infrared sensor 120d associated with the detection of light from an infrared beacon placed into an aircraft 50, this indicates that the container 10 is in an aircraft 50, in which case the control system 101 carries out the deactivation and reactivation operation as previously described in FIG. 6 above.

Frequency Beacon Sensor

The tracking device 100 may determine if the container 10 is in an aircraft 50 by using a frequency beacon sensor 120e that detects frequencies emitted by a frequency beacon placed in the aircraft 50. The tracking device includes a frequency beacon sensor 120e that detects signal frequencies emitted in the proximity of the frequency beacon sensor 120e associated with the container 10.

The frequency beacon sensor 120e in the preferred embodiment is the same as that described for the frequency detector 118c. The frequency beacon emits a signal frequency of 400 Hz, the same frequency emitted by aircraft 50 AC power distribution systems. In this manner, a redundancy is built into the system automatically. The frequency detector 120e will detect 400 Hz signals whether they are from the frequency beacon or from the aircraft 50 AC power distribution system, as described previously, thereby adding an extra measure of reliability and accuracy. However, it should be noted that a frequency beacon may be used that does not emit frequencies that are the same as those emitted naturally by an aircraft 50 and/or its systems as the sole method of determining whether or not a container 10 is in an aircraft 50.

A frequency detector that detects 400 Hz signals could indicate that the container 10 is on the aircraft 50 and provide for the tracking device 100 to be deactivated. Three receiving elements 440, as previously illustrated in FIG. 8, that are orthogonal to each other in three dimensions are used as the frequency beacon sensor 120e for detecting the desired frequency signals. The receiving elements 440 may be tuned circuits to detect the desired frequency, or magnetometers designed to sensitively measure AC field strengths, both of which are well known and commonplace.

If the control system 101 reads a signal from the frequency beacon sensor 120e that is known to be the frequency of the frequency beacon, the microprocessor 102 will know that the container 10 is in the aircraft 50 and will initiate the deactivation/reactivation procedure as previously described in FIG. 6 above.

Magnetic Marker Sensor

Figure 14A:
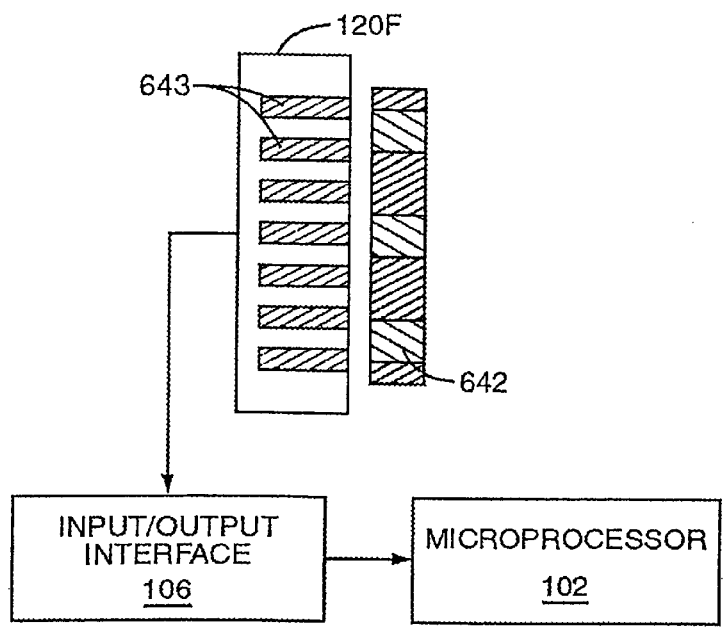
FIG. 14a is a schematic representation of a magnetic marker sensor.
Figure 14B:
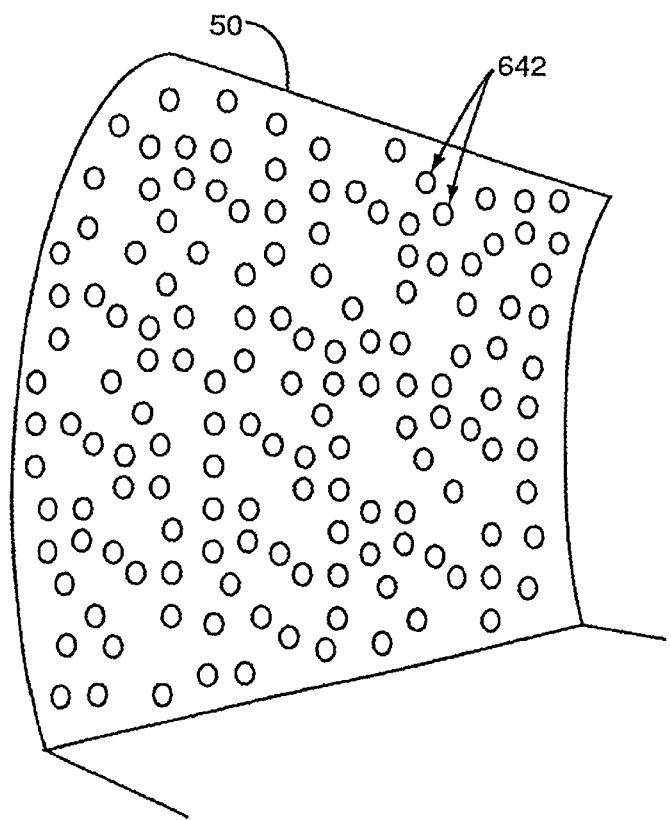
FIG. 14b is a schematic representation of a magnetic marker pattern.

As illustrated in FIGS. 14a and 14b, a magnetic marker sensor 120f may be used by the tracking device 100 to sense the presence of a cooperative marker 60 that is positioned within the aircraft 50. Information is placed in the cooperative marker 60 in the form of magnetic patterns 642 placed in the aircraft 5, as illustrated in FIG. 14a. The magnetic patterns 642 may contain information in a pattern like that of the Marconi Snowflake code 520 previously discussed above and shown in FIG. 11. The magnetic marker sensor 120f may also distinguish reading the magnetic marker 60 from left to right or top to bottom, depending on the alignment of the magnetic marker 60 to indicate the direction of movement of the container 10 with respect to the magnetic marker 60.

The magnetic marker sensor 120*f* receives magnetic signals from an array of magnetically charged patterns 642 made out of conductive material, as illustrated in FIG. 14*a*. The magnetic sensor 120*f* is in the form of an array of coils 643 that receive magnetic signals of the pattern 642. The magnetic marker sensor 120*f* passes the magnetic information to the microprocessor 102 of the control system 101 through the input/output interface 106. Based on the information nread from the magnetic marker 642, the control system 101 determines the container 10 is being loaded or has been loaded into an aircraft 50, in which case the control system 101 carries out the deactivation and reactivation process.

When more than one sensor 118,120 is included within the tracking device 100, the control system 101 may determine deactivation upon receiving signals from one or both sensors 118,120. In a configuration in which the control system 110 deactivates upon receiving only one signal, the sensors 118, 120 work as redundant systems to reduce the likelihood that the container could be placed on the aircraft 50 without deactivation. A redundant system allows for one of the sensors to be miscalibrated or damaged without impacting the deactivation process. Conversely, when the control system 101 requires both signals, the device is not deactivated by a sensor transmitting false loading readings.

Within both the environmental sensor 118 and cooperative marker sensor 120 embodiments, the control system 101 is sent signals that are interpreted as requiring deactivation. Immediately upon receiving a signal, the control system 101 may deactivate the tracking system as previously described in FIG. 6.

The sensors 118, 120 may also be used for determining when the container 10 enters an intrinsically safe area. If the container 10 is prohibited from entering areas that require intrinsic safety, this could restrict routes available for the container's 10 travel and may further restrict the utility of the container 10 for shipping applications.

Section 500-2 of the National Electrical Code Handbook (NEC), incorporated herein by reference in its entirety, indicates that "intrinsically safe" equipment is electrical equipment that "operates at a low voltage and are designed safe, regardless of short circuits, ground, over-voltage, equipment damage, or component failure." A wide range of industries such as, for example, electric utilities, power plants, oil refineries, off shore oil rigs, gas ethylene companies, chemical plants, coal mining operations, coal prep plants and transfer stations, gas pipelines, plastic manufacturers, granaries, etc. present very hazardous environments in which electrical equipment must be used. Because of these dangerous environments, various standards have been imposed by the NEC and by Underwriters Laboratories (UL) for the design of electrical equipment for hazardous areas.

The hazardous material sensor 118*h* is an environmental sensor 118 that senses when the container is in the presence of hazardous materials, including gas, liquids, or solids, and deactivates the tracking system 100. One type of hazardous material sensor 118*h* is disclosed in U.S. Pat. No. 5,782,275 for sensing hydrocarbons that are present in fuels, incorporated herein by reference in its entirety.

Additionally, the container may use cooperative marker sensors 120, described above, to detect when it is in or proximate to an intrinsically safe area. Cooperative markers 120 such as the optical marker 120*a*, ultrasonic marker 120*c*, infrared beacon 120*d*, frequency beacon 120*e*, and magnetic marker 120*f* all may be used individually or in combination to provide such functionality.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

The hazardous material sensor 118*h* is an environmental sensor 118 that senses when the container is in the presence of hazardous materials, including gas, liquids, or solids, and deactivates the tracking system 100. One type of hazardous material sensor 118*h* is disclosed in U.S. Pat. No. 5,782,275 for sensing hydrocarbons that are present in fuels, incorporated herein by reference in its entirety.

Additionally, the container may use cooperative marker sensors 120, described above, to detect when it is in or proximate to an intrinsically safe area. Cooperative markers 120 such as the optical marker 120*a*, ultrasonic marker 120*c*, infrared beacon 120*d*, frequency beacon 120*e*, and magnetic marker 120*f* all may be used individually or in combination to provide such functionality.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A device for determining the location of a container, comprising:
   (a) a tracking device operatively connected with the container; and
   (b) said tracking device includes a sensor for receiving information, said tracking device adapted to use said information to determine when the container is in proximity to a transportation vessel to deactivate said tracking device.

2. The device of claim 1, wherein said tracking device further includes a positioning system to receive positioning information concerning the container and a remote communication device to transmit said positioning information remotely.

3. The device of claim 2, wherein said positioning system receives said positioning information from at least one satellite.

4. The device of claim 2, wherein said positioning system receives said positioning information from a tower.

5. The device of claim 4, wherein said tower is an airport tower.

6. The device of claim 2, wherein said remote communicate device communicates said positioning information remotely to a remote site.

7. The device of claim 2, wherein said remote communication device communicates said positioning information remotely through a modem.

8. The device of claim 7, wherein said modem is a radio-frequency modem.

9. The device of claim 7, wherein said modem is a cellular phone modem.

10. The device of claim 6, wherein said remote communication device communicates said position information remotely to a remote site through satellite communications.

11. The device of claim 2, wherein said positioning system is a GPS.

12. The device of claim 2, wherein said tracking device further includes a control system, said control system adapted to receive said positioning information and transmit said positioning information remotely.

13. The device of claim 12, wherein said sensor is an environmental sensor.

14. The device of claim 13, wherein said environmental sensor is said positioning system, and said control system is adapted to deactivate said tracking device if said control system cannot receive said positioning information.

15. The device of claim 14, wherein said positioning system receives said positioning information from a plurality of satellites.

16. The device of claim 15, wherein said control system deactivates said remote communication device if said control system cannot receive said positioning information from all of said plurality of satellites.

17. The device of claim 15, wherein said control system deactivates said remote communication device if said control system does not receive said positioning information from at least two said plurality of satellites.

18. The device of claim 15, wherein said control system reactivates said remote communication device when said control device receives said positioning information from a least two said plurality of satellites.

19. The device of claim 15, wherein said control system reactivates said remote communication device when said control system receives said positioning information from one of said plurality of satellites.

20. The device of claim 15, wherein said control system reactivates said remote communication device when said control system receives said positioning information from all of said plurality of satellites.

21. The device of claim 13, wherein said environmental sensor is a pressure sensor that picks up pressure signals associated with the container.

22. The device of claim 21, wherein said control system deactivates said tracking device if said pressure signals exceed a threshold value.

23. The device of claim 21, wherein said control system deactivates said remote communication device if said pressure signals exceed a threshold value.

24. The device of claim 22, wherein said control system determines said threshold value by determining the particular type of transportation vessel.

25. The device of claim 22, wherein control system deactivates said remote communication device if said pressure signals exceed a threshold value.

26. The device of claim 13, wherein said environmental sensor is an altimeter whereby said control system determines the three-dimensional location of the container by using both said altitude information and said positioning information to determine if said tracking device should be deactivated.

27. The device of claim 26, wherein said control system determines the altitude of the container above ground level by correlating said three-dimensional location to a ground level value.

28. The device of claim 27, wherein said control system includes a memory having a look-up table for determining the ground level value.

29. The device of claim 28, wherein said control system communicates said three dimensional location remotely to a remote site and said remote site communicates said ground level value back to said control system.

30. The device of claim 27, wherein said control system deactivates said tracking device said three-dimensional location of the container is above ground level.

31. The device of claim 30, wherein said control system deactivates said remote communication device.

32. The device of claim 13, wherein said environmental sensor is an acoustic sensor that picks up acoustic signals surrounding the container.

33. The device of claim 32, wherein said acoustic signal represents engine noise of the transportation vessel.

34. The device of claim 32, wherein said acoustic signal represents an acoustic signature of the transportation vessel.

35. The device of claim 32, wherein said acoustic signal represents movement of the transportation vessel.

36. The device of claim 32, wherein said acoustic sensor is a microphone that picks up the acoustic signals.

37. The device of claim 36, wherein said acoustic sensor includes a digital signal processor that receives the acoustic signals and communicates the acoustic signals to said control system to determine if the acoustic signals are from a transportation vessel.

38. The device of claim 32, wherein said acoustic sensor includes a first microphone that picks up acoustic signals from the air and a second microphone that picks up vibrations from the structure of the aircraft.

39. The device of claim 32, wherein said control system determines the type of transportation vessel based on the acoustic signal.

40. The device of claim 27, wherein said control system deactivates said tracking device if said control system determines that the acoustic signals represent signals associated with the transportation vessel.

41. The device of claim 40, wherein said control system deactivates said remote communication device.

42. The device of claim 13, wherein said environmental sensor is a frequency detector whereby said control system determines frequency signals surrounding the container.

43. The device of claim 41, wherein said frequency detector is comprised of coils and a tuned circuit to determine the presence of specific said frequency signals.

44. The device of claim 41, wherein said frequency detector is a magnetometer.

45. The device of claim 40, wherein said frequency detector picks up said frequency signals independent of orientation.

46. The device of claim 40, wherein said control system uses said frequency signals to determine if the transportation vessel is powered.

47. The device of claim 40, wherein said control system deactivates said tracking system if the frequency signals indicate that the transportation vessel is powered.

48. The device of claim 47, wherein said control system deactivates said remote communication device.

49. The device of claim 13, wherein said environmental sensor is a motion sensor that detects movement made by the transportation vessel.

50. The device of claim 49, wherein said motion sensor is a piezoelectric device.

51. The device of claim 49, wherein said motion sensor is a mercury switch.

52. The device of claim 49, wherein said control system deactivates said tracking system if signals from the motion sensor indicate that the container is in the transportation vessel.

53. The device of claim 52, wherein said control system deactivates said remote communication device.

54. The device of claim 13, wherein said environmental sensor is a capacitance sensor that senses capacitance associated with the container.

55. The device of claim 54, wherein said control system deactivates said tracking device if said control system determines that the capacitance is associated with the transportation vessel.

56. The device of claim 55, wherein said control system deactivates said remote communication device.

57. The device of claim 13, wherein said environmental sensor is a shape sensor that senses the curvatures of the container surroundings.

58. The device of claim 57, wherein said control system deactivates said tracking device if said control system determines the signals from said shape sensor are indicative of the shape of the transportation vessel.

59. The device of claim 58, wherein said control system deactivates said remote communication device.

60. The device of claim 13, wherein said environmental sensor is an imaging sensor further comprised of an imaging emitter and an imaging detector, wherein said imaging emitter emits a beam and said imaging detector detects the reflection of said beam.

61. The device of claim 60, wherein said control system deactivates said remote communication device.

62. The device of claim 13, wherein said environmental sensor is comprised of at least two sensors in the group consisting of: positioning system, acoustic sensor, frequency detector, pressure sensor, altimeter, motion sensor, capacitance sensor, and optical sensor.

63. The device of claim 12, wherein said sensor is a cooperative marker sensor that detects marker information in proximity to the transportation vessel.

64. The device of claim 63, wherein said cooperative marker sensor is an optical marker sensor and wherein said marker information is a code.

65. The device of claim 64, wherein said control system deactivates said remote communication device.

66. The device of claim 64, wherein said code is a bar code.

67. The device of claim 66, wherein said code is a Snowflake code.

68. The device of claim 63, wherein said cooperative marker sensor is a capacitance marker sensor and said marker information is comprised of at least one metal plate.

69. The device of claim 68, wherein said control system deactivates said remote communication device.

70. The device of claim 63, wherein said cooperative marker sensor is an ultrasonic marker sensor and said marker information is an emitted ultrasonic signal.

71. The device of claim 70, wherein said control system deactivates said remote communication device.

72. The device of claim 70, wherein said ultrasonic marker sensor is an ultrasonic transponder.

73. The device of claim 63, wherein said cooperative marker sensor is an infrared beacon and said marker information is an infrared signal.

74. The device of claim 73, wherein said control system deactivates said remote communication device.

75. The device of claim 63, wherein said cooperative marker sensor is a frequency beacon sensor and said marker information is a frequency signal.

76. The device of claim 75, wherein said control system deactivates said remote communication device.

77. The device of claim 74, wherein said frequency beacon sensor is comprised of coils and a tuned circuit to determine the presence of specific frequency signals.

78. The device of claim 74, wherein said frequency beacon sensor is a magnetometer.

79. The device of claim 74, wherein said frequency beacon sensor detects frequency signals independent of orientation.

80. The device of claim 74, wherein the frequency signals are substantially the same frequency emitted by the power system of the transportation vessel.

81. The device of claim 80, wherein the frequency signals emitted by the power system are from an AC power source.

82. The device of claim 81, wherein the frequency signals are AC 400 Hz.

83. The device of claim 63, wherein said cooperative marker sensor is a magnetic sensor and said marker information is a magnetic pattern.

84. The device of claim 83, wherein said control system deactivates said remote communication device.

85. The device of claim 63, wherein said marker information includes information associated with the transportation vessel.

86. The device of claim 85, wherein said information is the particular type of transportation vessel.

87. The device of claim 85, wherein said information is an itinerary information of the transportation vessel.

88. The device of claim 87, wherein said itinerary information is used by said control system to reactivate said tracking device.

89. The device of claim 88, wherein said control system reactivates said remote communication device.

90. The device of claim 12, wherein said control system deactivates said tracking device for a specified period of time.

91. The device of claim 12, wherein said control system deactivates said remote communication device.

92. The device of claim 90, wherein said control system deactivates said tracking device for a specified period of time based on said itinerary.

93. The device of claim 90, wherein said control system is associated with a timer circuit whereby said control system programs said timer circuit to wake up said control system after a specific period of time.

94. The device of claim 1, wherein said tracking device disables said remote communication device only.

95. The device of claim 94, wherein said tracking device disables power to said remote communication device.

96. The device of claim 2, wherein said tracking device further includes a portable access port to allow access to said tracking device by a portable computer.

97. The device of claim 96, wherein said tracking device is adapted to activate said remote communication device when directed to do so by the portable computer.

98. The device of claim 97, wherein said tracking device communicates said positioning information through said portable access port.

99. The device of claim 97, wherein said tracking device communicates to a remote site through said portable access port.

100. The device of claim 1, wherein said tracking device is adapted to use said sensor information to determine when the container is in proximity to hazardous materials to deactivate said tracking device.

101. The device of claim 100, wherein the hazardous materials are detected by an environmental sensor.

102. The device of claim 101, wherein said environmental sensor is selected from the group consisting of a hazardous liquid sensor, a hazardous gas sensor, and a hazardous solid sensor.

103. The device of claim 100, wherein the hazardous materials are detected by a cooperative marker sensor.

104. A method of deactivating a tracking device associated with a container, comprising the steps of:
(a) associating a tracking device with the container;
(b) sensing when the container is in proximity to the transportation vessel; and
(c) deactivating said tracking device when the container is in proximity to the transportation vessel.

105. The method of claim 104, further comprising the step of reactivating said tracking device when the container is removed from the transportation vessel.

106. The method of claim 104, wherein said tracking device receives positioning information concerning the location of the container.

107. The method of claim 106, further comprising the step of receiving said positioning information from at least one satellite.

108. The method of claim 106, further comprising the step of communicating said positioning information locally.

109. The method of claim 106, further comprising the step of communicating said positioning information remotely.

110. The method of claim 104, wherein said step of determining when the container is in proximity to the transportation vessel is performed by sensing the environment associated with the container.

111. The method of claim 110, wherein said sensing the environment is performed by determining if the tracking device is receiving positioning information about the location of the container.

112. The device of claim 111, wherein the positioning information is from a plurality of satellites.

113. The device of claim 112, wherein said step of deactivating said tracking device is performed if said tracking device cannot receive the positioning information from all of said plurality of satellites.

114. The device of claim 112, wherein said step of deactivating said tracking device is performed if said tracking device cannot receive the receiving information from at least two of said plurality of satellites.

115. The device of claim 112, wherein said tracking device reactivates said tracking device when said tracking device receives the positioning information from a least two said plurality of satellites.

116. The device of claim 112, wherein said tracking device reactivates said tracking device when said tracking device receives the positioning information from one of said plurality of satellites.

117. The device of claim 112, wherein said tracking device reactivates said tracking device when said control system receives said positioning information from all of said plurality of satellites.

118. The method of claim 110, wherein said sensing the environment is performed by sensing the acoustics associated with the container.

119. The method of claim 118, further comprising the step of determining the particular type of transportation vessel based on said sensing of acoustics.

120. The method of claim 110, wherein said sensing the environment is performed by measuring signal frequencies surrounding the container.

121. The method of claim 120, wherein said measuring signal frequencies is performed in an orientation independent manner.

122. The method of claim 120, further comprising the step of determining if the transportation vessel is powered.

123. The method of claim 110, wherein said sensing the environment is performed by measuring the pressure associated with the container.

124. The method of claim 110, wherein said sensing the environment is performed by determining the altitude the container and using said altitude in conjunction with the location of the container to determine the three dimensional location of the container.

125. The method of claim 124, wherein determining the three dimensional location of the container is performed using a look-up table.

126. The method of claim 124, further comprising the step of communicating said three-dimensional location remotely to a remote site.

127. The method of claim 110, wherein said sensing the environment is performed by measuring the movement of the container.

128. The method of claim 110, wherein said sensing the environment is performed by measuring the vibration of the container.

129. The method of claim 110, wherein said sensing the environment is performed by measuring the vibration of the transportation vessel.

130. The method of claim 110, wherein said sensing the environment is performed by measuring the capacitance associated with the container.

131. The device of claim 110, wherein said sensing the environment is performed by sensing the shape of the curvatures of the container surroundings.

132. The method of claim 110, wherein said step of determining when the container is in proximity to the transportation vessel is performed by sensing a cooperative marker in proximity to the transportation vessel.

133. The method of claim 132, wherein said cooperative marker is a code proximate to the transportation vessel.

134. The method of claim 133, wherein said sensing a cooperative marker is performed optically.

135. The method of claim 132, wherein said sensing a cooperative marker is performed optically.

136. The method of claim 132, wherein said cooperative marker is a magnetic pattern.

137. The method of claim 132, further comprising the step of determining the particular type of container from said sensing a cooperative marker.

138. The method of claim 132, further comprising the step of determining the itinerary of the container from said sensing a cooperative marker.

139. The method of claim 138, further comprising the step of reactivating said tracking device based on the itinerary of the container.

140. The method of claim 132, wherein said wherein said cooperative marker is a frequency beacon marker.

141. The method of claim 140, wherein said frequency beacon emits a frequency signals that is approximately the same signal emitted by the power system of the transportation vessel.

142. The method of claim 140, wherein said sensing is performed independent of the orientation of the container.

143. The method of claim 132, wherein said cooperative marker is an infrared beacon marker.

144. The method of claim 132, wherein said cooperative marker is an ultrasonic signal.

145. The method of claim 104, wherein said step of deactivating said tracking device is performed for specified period of time.

146. The method of claim 104, wherein said step of deactivating said tracking device is maintained during the scheduled journey of the container on the transportation vessel based on the itinerary of the container.

147. The method of claim 104, further comprising accessing said tracking device through a portable access port.

148. The method of claim 147, further comprising communicating the location of the container through said portable access port.

149. The method of claim 147, further comprising transmitting the location of the container remotely.

150. A tracking device associated with a cargo container that is placed into a vessel for transmitting the location of the cargo container, said tracking device comprising:
  (a) a GPS system for receiving positioning information of the cargo container;
  (b) a cellular phone modem adapted to receive said positioning information and transmit said positioning information to a remote site;
  (c) a sensor operatively associated with the cargo container to sense information concerning the surroundings of the cargo container; and
  (d) a control system adapted to receive said information from said sensor to deactivate the cellular phone modem when the cargo container is in proximity to the vessel.

151. A tracking device associated with a cargo container that is placed into an aircraft, comprising:
  (a) means for receiving positioning information of the cargo container;
  (b) means for receiving said positioning information and means for transmitting said positioning information remotely;
  (c) means for sensing information concerning the surroundings of the cargo container; and
  (d) means for receiving said sensing information to determine when cargo container is in proximity to the aircraft and to deactivate said transmitting means.

* * * * *